United States Patent
Chen

(10) Patent No.: US 12,224,891 B2
(45) Date of Patent: Feb. 11, 2025

(54) METHOD AND APPARATUS FOR PERFORMING EFFICIENT CORRELATION COMPUTATION BETWEEN DATA SEQUENCE AND BOTH OF IN-PHASE CODE SEQUENCE AND QUADRATURE CODE SEQUENCE

(71) Applicant: MEDIATEK INC., Hsin-Chu (TW)

(72) Inventor: Kun-Tso Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 63 days.

(21) Appl. No.: 18/210,644

(22) Filed: Jun. 15, 2023

(65) Prior Publication Data
US 2024/0039772 A1 Feb. 1, 2024

Related U.S. Application Data

(60) Provisional application No. 63/353,091, filed on Jun. 17, 2022.

(51) Int. Cl.
*H04L 27/227* (2006.01)
*H04B 1/709* (2011.01)
*H04L 27/20* (2006.01)

(52) U.S. Cl.
CPC ......... *H04L 27/2277* (2013.01); *H04B 1/709* (2013.01); *H04L 27/2082* (2013.01)

(58) Field of Classification Search
CPC .. H04L 27/2277; H04L 27/2082; H04B 1/709
See application file for complete search history.

(56) References Cited

U.S. PATENT DOCUMENTS

| | | | | |
|---|---|---|---|---|
| 5,822,365 | A | 10/1998 | Lee | |
| 7,206,336 | B1 * | 4/2007 | Rog | H04B 1/7075 375/150 |
| 7,333,422 | B2 * | 2/2008 | Amer | G06F 17/142 370/208 |
| 2005/0229068 | A1 * | 10/2005 | Akopian | G06F 17/15 375/E1.016 |
| 2008/0240306 | A1 * | 10/2008 | Chen | H04L 7/042 375/343 |
| 2012/0275551 | A1 * | 11/2012 | Jokitalo | G01S 19/30 375/343 |
| 2023/0385371 | A1 * | 11/2023 | Chen | G01S 19/30 |

FOREIGN PATENT DOCUMENTS

| | | |
|---|---|---|
| CN | 1086864 C | 6/2002 |
| CN | 102449919 A | 5/2012 |
| EP | 0661831 A2 * | 7/1995 |

OTHER PUBLICATIONS

Machine translation of CN-1130962-A (Year: 1996).*

* cited by examiner

*Primary Examiner* — Jean B Corrielus
(74) *Attorney, Agent, or Firm* — Winston Hsu

(57) ABSTRACT

A correlation computation method includes: performing, by a grouping circuit, a grouping operation upon a data sequence according to an in-phase code sequence and a quadrature code sequence, wherein the data sequence is derived from a quadrature phase shift keying (QPSK) modulated signal; performing at least one accumulation operation upon data samples categorized into at least one data sample group by the grouping operation, to generate at least one accumulation result; and deriving a correlation value between the data sequence and both of the in-phase code sequence and the quadrature code sequence from the at least one accumulation result.

22 Claims, 19 Drawing Sheets

0: 1 transmitted
1: -1 transmitted

METHOD AND APPARATUS FOR PERFORMING EFFICIENT CORRELATION COMPUTATION BETWEEN DATA SEQUENCE AND BOTH OF IN-PHASE CODE SEQUENCE AND QUADRATURE CODE SEQUENCE

CROSS REFERENCE TO RELATED APPLICATIONS

This application claims the benefit of U.S. Provisional Application No. 63/353,091, filed on Jun. 17, 2022. The content of the application is incorporated herein by reference.

BACKGROUND

The present invention relates to correlation computation, and more particularly, to a method and apparatus for performing efficient correlation computation between a data sequence and both of an in-phase code sequence and a quadrature code sequence.

The global navigation satellite system (GNSS) is often described as an "invisible utility", and is so effective at delivering two essential services—time and position—accurately, reliably and cheaply that many aspects of the modern world have become dependent upon them. Each satellite of the GNSS is equipped with a highly precise atomic clock. When four or more satellites are in view, a GNSS receiver can calculate the distance to each satellite by measuring the time delay between signal transmission and receipt. From this, a GNSS-embedded device can derive accurate time and its own position.

A typical GNSS signal is modulated by pseudo random noise (PRN) code. The PRN code is a code sequence with randomly distributed 0's and 1's. Each satellite transmits a unique PRN code. For example, data for transmission is combined by bit-wise XOR with a code sequence (i.e., a unique PRN code of the satellite) according to code-division multiple access (CDMA), and then a resulting spread-spectrum sequence is modulated by binary phase shift keying (BPSK) for transmission, where a logic value 0 of the spread-spectrum sequence is mapped to +1 for BPSK modulation, and a logic value 1 of the spread-spectrum sequence is mapped to −1 for BPSK modulation.

The growing demand of location, navigation and positioning services is boosting the development of new signals and modulations that will be adopted by the new GNSS. A common feature of these new signals is the presence of quadrature phase shift keying (QPSK) modulation with the in-phase (I) component and quadrature (Q) component of the baseband signal modulated by different data and PRN codes. In general, a logic value 0 is mapped to +1 and a logic value 1 is mapped to −1 for QPSK modulation.

Generally speaking, many correlation hypotheses are required by a GNSS receiver to search the satellite (i.e., match the satellite PRN code), where each hypothesis requires a correlation operation between a local complex code sequence $\{C_n, n=0, 1, \ldots, N-1\}$ (which consists of an in-phase code sequence $\{C_{I,n}, n=0, 1, \ldots, N-1\}$ and a quadrature code sequence $\{C_{Q,n}, n=0, 1, \ldots, N-1\}$) and a received data sequence $\{r_n = r_{I,n} + j \cdot r_{Q,n}, n=0, 1, \ldots, N-1\}$ to generate a correlation result. One typical QPSK correlator design using BPSK-channel-combining to treat I-component and Q-component as two independent BPSK signals may require 2N accumulations for obtaining the correlation result. Another typical QPSK correlator design using coherent-QPSK-combining that employs complex local PRN codes $C_{I,n} + j \cdot C_{Q,n}$ (n=0, 1, \ldots, N-1) and $C_{I,n} - j \cdot C_{Q,n}$ (n=0, 1, \ldots, N-1) may require 4N accumulations for obtaining the correlation result. The number of accumulations performed during the correlation process must be reduced to save the power. Thus, there is a need for an efficient spread-spectrum QPSK correlator that is capable of generating a correlation value with reduced computation complexity.

SUMMARY

One of the objectives of the claimed invention is to provide a method and apparatus for performing efficient correlation computation between a data sequence and both of an in-phase code sequence and a quadrature code sequence.

According to a first aspect of the present invention, an exemplary correlation computation method is disclosed. The exemplary correlation computation method includes: performing, by a grouping circuit, a grouping operation upon a data sequence according to an in-phase code sequence and a quadrature code sequence, wherein the data sequence is derived from a quadrature phase shift keying (QPSK) modulated signal; performing at least one accumulation operation upon data samples categorized into at least one data sample group by the grouping operation, to generate at least one accumulation result; and deriving a correlation value between the data sequence and both of the in-phase code sequence and the quadrature code sequence from said at least one accumulation result.

According to a second aspect of the present invention, an exemplary correlation computation apparatus is disclosed. The exemplary correlation computation apparatus includes a grouping circuit, an accumulation-based circuit, and a processing circuit. The grouping circuit is arranged to perform a grouping operation upon a data sequence according to an in-phase code sequence and a quadrature code sequence, wherein the data sequence is derived from a QPSK modulated signal. The accumulation-based circuit is arranged to perform at least one accumulation operation upon data samples categorized into at least one data sample group by the grouping circuit, to generate at least one accumulation result. The processing circuit is arranged to derive a correlation value between the data sequence and both of the in-phase code sequence and the quadrature code sequence from said at least one accumulation result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
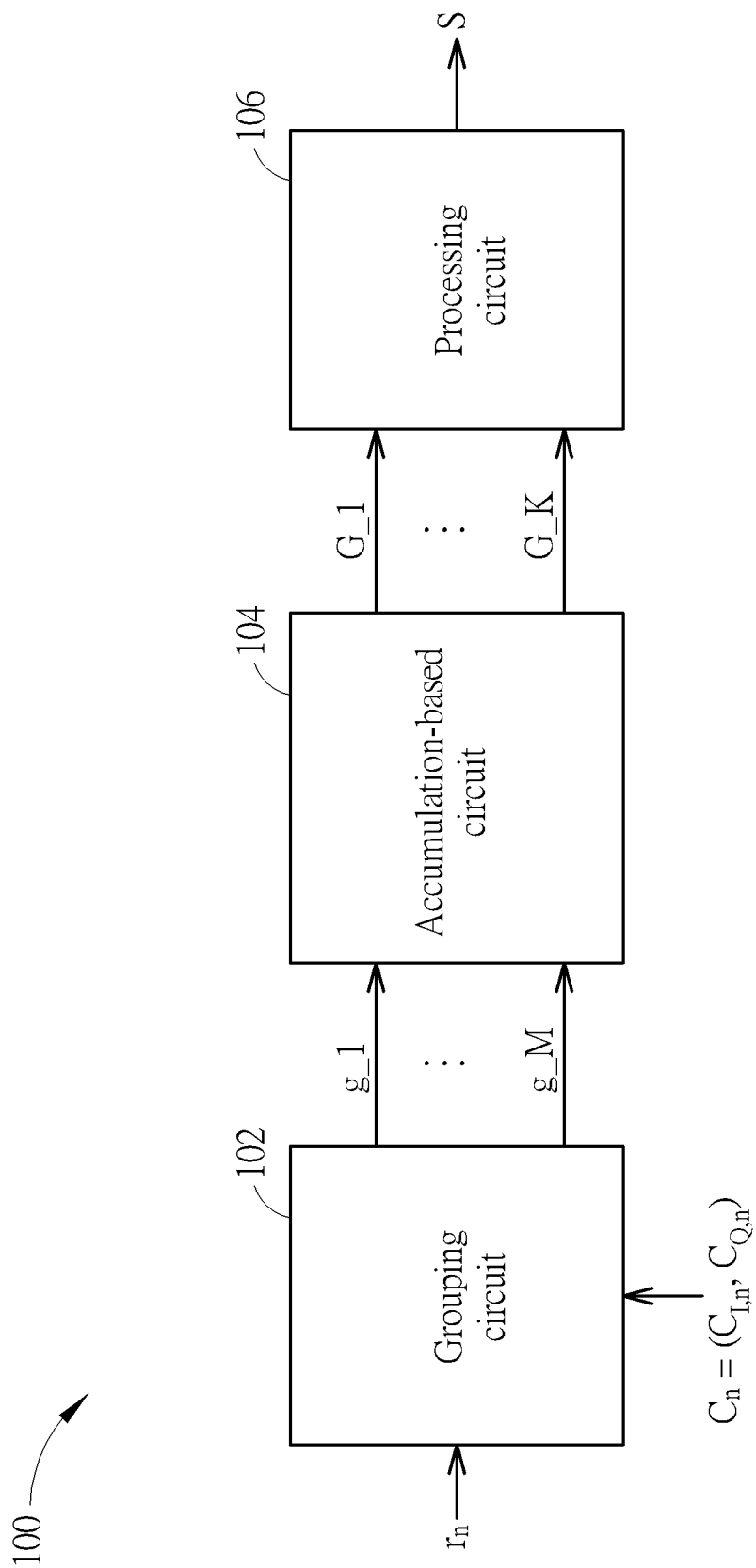
FIG. 1 is a block diagram illustrating a correlation computation apparatus according to an embodiment of the present invention.

FIG. 1 is a block diagram illustrating a correlation computation apparatus according to an embodiment of the present invention. By way of example, but not limitation, the correlation computation apparatus 100 may be apart of a PRN code correlator (i.e., QPSK correlator) in a GNSS receiver that may support processing of modern GNSS QPSK signals, including GPS L5, Galileo E5a and E5b, BeiDou B2a, etc. The GNSS receiver may include a plurality of signal processing stages, including an intermediate frequency (IF) removal stage, a Doppler removal stage, a PRN code correlator (which employs the proposed correlation computation apparatus 100), and a signal detection stage (which is used for acquisition, tracking, and decoding). In one exemplary GNSS receiver design, the PRN code correlator (which employs the proposed correlation computation apparatus 100) may be located between a preceding Doppler removal stage and a following signal detection stage. In another exemplary GNSS receiver design, the PRN code correlator (which employs the proposed correlation computation apparatus 100) may be located between a preceding IF removal stage and a following Doppler removal stage. However, these are for illustrative purposes only, and are not meant to be limitations of the present invention. To put it simply, any correlation computation design using the proposed computation complexity reduction technique falls within the scope of the present invention.

In this embodiment, the correlation computation apparatus 100 includes a grouping circuit 102, an accumulation-based circuit 104, and a processing circuit 106. It should be noted that only the components pertinent to the present invention are illustrated in FIG. 1. In practice, the correlation computation apparatus 100 may include additional components for other designated functions. For example, the correlation computation apparatus 100 may further include a post integration stage arranged to combine correlation values generated from correlation computation between the same received data sequence $\{r_n = r_{I,n} + j \cdot r_{Q,n}, n=0, 1, \ldots, N-1\}$ and unique PRN code sequences $\{C_n^{(P)}, n=0, 1, \ldots, N-1, p=0, 1, \ldots, P-1\}$ of different satellites.

In one exemplary design, the correlation computation apparatus 100 may be implemented using dedicated hardware that is designed to perform the proposed correlation computation method. In another exemplary design, the correlation computation apparatus 100 may be implemented using a general-purpose processor that loads and executes program codes to perform the proposed correlation computation method. In yet another exemplary design, the correlation computation apparatus 100 may be implemented using any combination of hardware and software. To put it simply, any correlation computation design using the proposed computation complexity reduction technique falls within the scope of the present invention.

The grouping circuit 102 is arranged to perform a grouping operation upon the received data sequence $\{r_n, n=0, 1, \ldots, N-1\}$ according to a unique complex PRN code sequence $\{C_n, n=0, 1, \ldots, N-1\}$ of a satellite, where the complex PRN code sequence $\{C_n, n=0, 1, \ldots, N-1\}$ consists of an in-phase code sequence $\{C_{I,n}, n=0, 1, \ldots, N-1\}$ and a quadrature code sequence $\{C_{Q,n}, n=0, 1, \ldots, N-1\}$. The data sequence $\{r_n, n=0, 1, \ldots, N-1\}$ is derived from a QPSK modulated signal transmitted from a satellite. Specifically, the QPSK modulated signal at the input of the GNSS receiver may include a QPSK transmitted signal, or may be regarded as a composite signal including a QPSK transmitted signal and a channel noise (e.g., additive Gaussian noise), or may be regarded as a composite signal including a QPSK transmitted signal, a channel noise (e.g., additive Gaussian noise), and other signal component(s). To put it simply, the data sequence $\{r_n, n=0, 1, \ldots, N-1\}$ is derived from a received signal that is obtained from a transmitted signal whose source is a transmitter (e.g., GNSS satellite) that employs a QPSK modulation scheme. The QPSK modulated signal is received by the receiver antenna, down-converted and filtered by the receiver front-end, and sampled and digitized by the receiver analog-to-digital converter (ADC). The ADC can capture one sample of the received signal per PRN code bit. Or several samples per PRN code bit are captured by the ADC and are processed further to get a data sample per PRN code bit. On the other hand, the samples per PRN code bit can be used to correlate with the corresponding samples of a local PRN code bit. Other signal processing might be applied before correlation, such as carrier frequency or Doppler frequency removal. To describe our invention more clearly, the following embodiments use one sample per PRN code bit and without other signal processing. In this embodiment, the data sequence $\{r_n, n=0, 1, \ldots, N-1\}$ may be modeled by $r_n = r_{I,n} + j \cdot r_{Q,n}$, $n=0, 1, \ldots, N-1$.

The accumulation-based circuit 104 is arranged to perform at least one accumulation operation upon data samples categorized into at least one data sample group g_1-g_M (M≥1) by the grouping circuit 102, to generate at least one accumulation result G_1-G_K (K≥1). The number of data sample groups g_1-g_M depends on actual design considerations of the grouping circuit 102. The number of accumulation results G_1-G_K depends on actual design considerations of the accumulation-based circuit 104.

The processing circuit 106 is arranged to derive a correlation value S between the data sequence $\{r_n, n=0, 1, \ldots, N-1\}$ and both of the in-phase code sequence $\{C_{I,n}, n=0, 1, \ldots, N-1\}$ and the quadrature code sequence $\{C_{Q,n}, n=0, 1, \ldots, N-1\}$ from at least one accumulation result G_1-G_K output from the accumulation-based circuit 104.

For better comprehension of technical features of the present invention, some exemplary designs of the grouping circuit 102, some exemplary designs of the accumulation-based circuit 104, and some exemplary designs of the processing circuit 106 are described as below with reference to the accompanying drawings.

Figure 2:
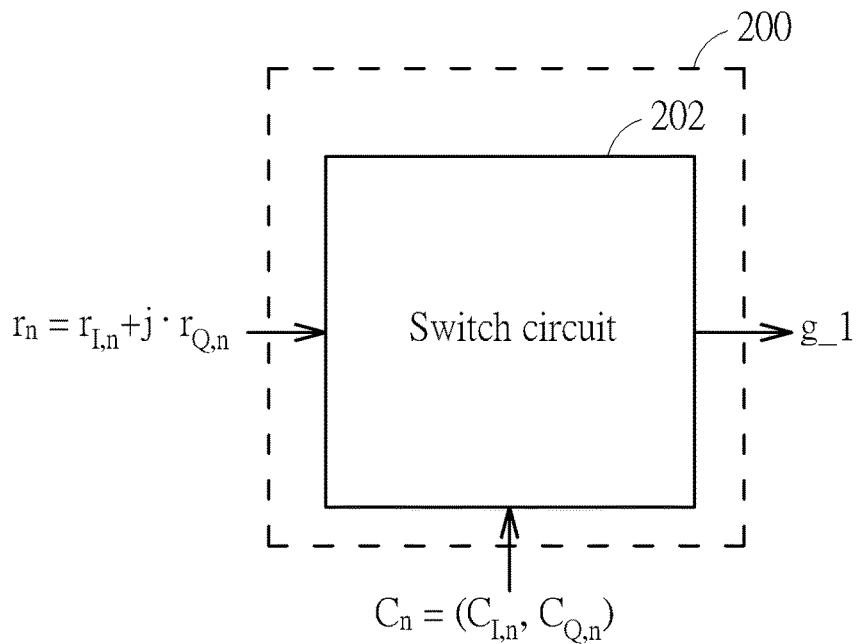
FIG. 2 is a diagram illustrating a first grouping circuit design according to an embodiment of the present invention.

FIG. 2 is a diagram illustrating a first grouping circuit design according to an embodiment of the present invention. The grouping circuit 102 shown in FIG. 1 may be implemented by the grouping circuit 200 shown in FIG. 2, where the grouping circuit 200 includes a switch circuit 202. In this embodiment, the number of data sample groups g_1-g_M is equal to one (M=1). Hence, for each data sample $r_n$ included in the data sequence $\{r_n, n=0, 1, \ldots, N-1\}$, the switch circuit 202 checks a pair of an in-phase code bit $C_{I,n}$ and a quadrature code bit $C_{Q,n}$ (also called chips due to bearing no useful data information) corresponding to the data sample $r_n$ to determine whether to categorize the data sample $r_n$ into a single data sample group g_1 for accumulation, wherein the in-phase code bit $C_{I,n}$ is included in the in-phase code sequence $\{C_{I,n}, n=0, 1, \ldots, N-1\}$, and the quadrature code bit $C_{Q,n}$ is included in the quadrature code sequence $\{C_{Q,n}, n=0, 1, \ldots, N-1\}$.

Figure 3:
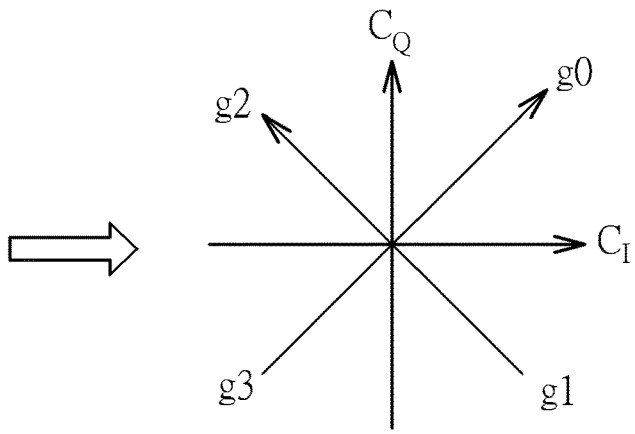
FIG. 3 is a diagram illustrating four data sample group g0, g1, g2, and g3 defined by their phase relationship in the QPSK modulation.

The single data sample group g_1 may be set by one of a plurality of data sample groups g0, g1, g2, and g3, depending upon actual design considerations. FIG. 3 is a diagram illustrating four data sample group g0, g1, g2, and g3 defined by their phase relationship in the QPSK modulation. A logic value 0 of the in-phase code bit $C_{I,n}$ is mapped to +1 for QPSK modulation, and a logic value 1 of the in-phase code bit $C_{I,n}$ is mapped to −1 for QPSK modulation. Similarly, a logic value 0 of the quadrature code bit $C_{Q,n}$ is mapped to +1 for QPSK modulation, and a logic value 1 of the quadrature code bit $C_{Q,n}$ is mapped to −1 for QPSK modulation. For example, the data sample group g0 corresponds to a condition that both I component and Q component transmit '0' PRN code chip, the data sample group g1 corresponds to a condition that I component transmits '0' PRN code chip and Q component transmits '1' PRN code chip, the data sample group g2 corresponds to a condition that I component transmits '1' PRN code chip and Q component transmits '0' PRN code chip, and the data sample group g3 corresponds to a condition that both I component and Q component transmit '1' PRN code chip. In the QPSK modulation constellation, the phase of g0 and g3 differs by 180 degrees, and the phase of g1 and g2 differs by 180 degrees. The combination of multiple data sample groups is based on the phase relationship among them.

In a case where the single data sample group g_1 shown in FIG. 2 is set by g0, data samples $r_n$ included in the data sequence $\{r_n, n=0, 1, \ldots, N-1\}$ that correspond to the same combination of I-component PRN code and Q-component PRN code $(C_{I,n}, C_{Q,n})=(0, 0)$ are categorized into the data sample group g_1 for accumulation.

In a case where the single data sample group g_1 shown in FIG. 2 is set by g1, data samples $r_n$ included in the data sequence $\{r_n, n=0, 1, \ldots, N-1\}$ that correspond to the same combination of I-component PRN code and Q-component PRN code $(C_{I,n}, C_{Q,n})=(0, 1)$ are categorized into the data sample group g_1 for accumulation.

In a case where the single data sample group g_1 shown in FIG. 2 is set by g2, data samples $r_n$ included in the data sequence $\{r_n, n=0, 1, \ldots, N-1\}$ that correspond to the same combination of I-component PRN code and Q-component PRN code $(C_{I,n}, C_{Q,n})=(1, 0)$ are categorized into the single data sample group g_1 for accumulation.

In a case where the single data sample group g_1 shown in FIG. 2 is set by g3, data samples $r_n$ included in the data sequence $\{r_n, n=0, 1, \ldots, N-1\}$ that correspond to the same combination of I-component PRN code and Q-component PRN code $(C_{I,n}, C_{Q,n})=(1, 1)$ are categorized into the data sample group g_1 for accumulation.

Figure 4:
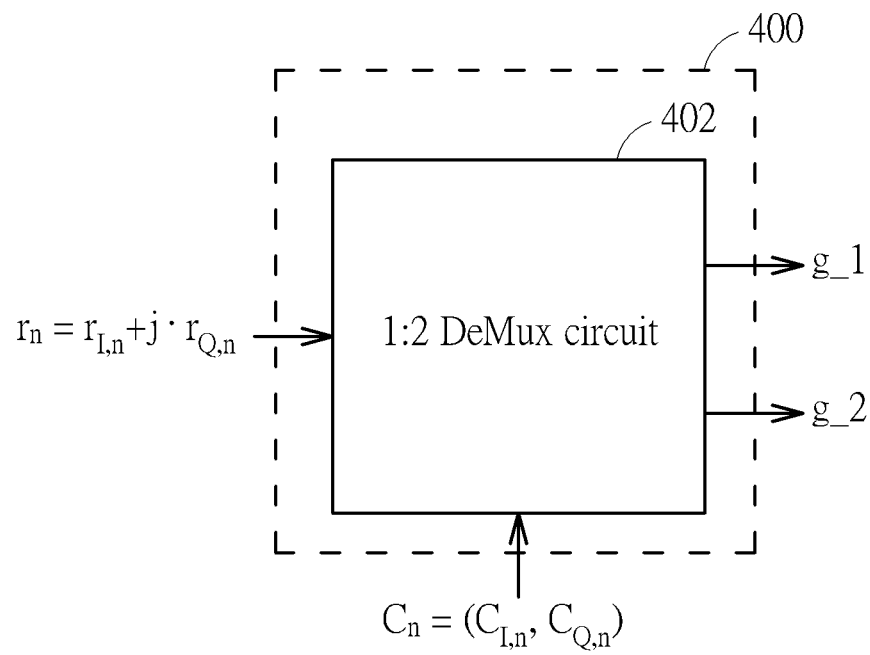
FIG. 4 is a diagram illustrating a second grouping circuit design according to an embodiment of the present invention.

FIG. 4 is a diagram illustrating a second grouping circuit design according to an embodiment of the present invention. The grouping circuit 102 shown in FIG. 1 may be implemented by the grouping circuit 400 shown in FIG. 4, where the grouping circuit 400 includes a 1:2 demultiplexer (De-Mux) circuit 402. In this embodiment, the number of data sample groups g_1-g_M is equal to two (M=2). Hence, for each data sample $r_n$ included in the data sequence $\{r_n, n=0, 1, \ldots, N-1\}$, the 1:2 DeMux circuit 402 checks a pair of an in-phase code bit $C_{I,n}$ and a quadrature code bit $C_{Q,n}$ corresponding to the data sample $r_n$ to determine whether to categorize the data sample $r_n$ into one of two data sample groups g_1 and g_2 for accumulation, wherein the in-phase code bit $C_{I,n}$ is included in the in-phase code sequence $\{C_{I,n}, n=0, 1, \ldots, N-1\}$, and the quadrature code bit $C_{Q,n}$ is included in the quadrature code sequence $\{C_{Q,n}, n=0, 1, \ldots, N-1\}$.

The data sample groups g_1 and g_2 may be any two of the data sample group g0, g1, g2, and g3 illustrated in FIG. 3. For example, two data sample groups g_1 and g_2 may be set by g0 and g3 or may be set by g1 and g2. For another example, two data sample groups g_1 and g_2 may be set by g0 and g1 or may be set by g2 and g3. For yet another example, two data sample groups g_1 and g_2 may be set by g0 and g2 or may be set by g0 and g1. It should be noted that the selection of data sample groups g_1 and g_2 depends on actual design considerations.

Figure 5:
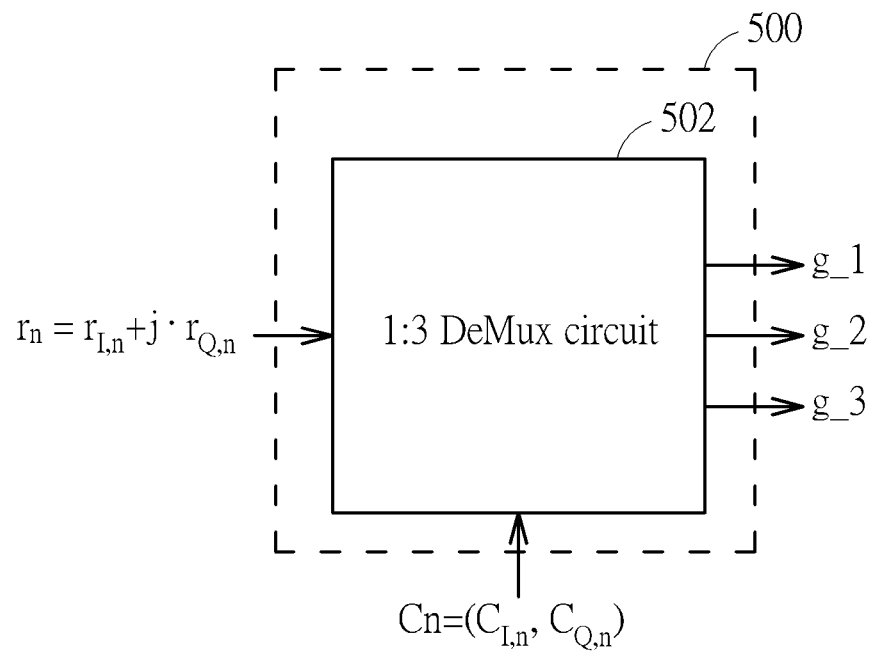
FIG. 5 is a diagram illustrating a third grouping circuit design according to an embodiment of the present invention.

FIG. 5 is a diagram illustrating a third grouping circuit design according to an embodiment of the present invention. The grouping circuit 102 shown in FIG. 1 may be implemented by the grouping circuit 500 shown in FIG. 5, where the grouping circuit 500 includes a 1:3 demultiplexer (De-Mux) circuit 502. In this embodiment, the number of data sample groups g_1-g_M is equal to three (M=3). Hence, for each data sample $r_n$ included in the data sequence $\{r_n, n=0, 1, \ldots, N-1\}$, the 1:3 DeMux circuit 502 checks a pair of an in-phase code bit $C_{I,n}$ and a quadrature code bit $C_{Q,n}$ corresponding to the data sample $r_n$ to determine whether to categorize the data sample $r_n$ into one of three data sample groups g_1, g_2, and g_3 for accumulation, wherein the in-phase code bit $C_{I,n}$ is included in the in-phase code sequence $\{C_{I,n}, n=0, 1, \ldots, N-1\}$, and the quadrature code bit $C_{Q,n}$ is included in the quadrature code sequence $\{C_{Q,n}, n=0, 1, \ldots, N-1\}$. The data sample groups g_1, g_2, and g_3 may be any three of the data sample group g0, g1, g2, and g3 illustrated in FIG. 3. For example, three data sample groups g_1, g_2, and g_3 may be set by g0, g3, and g2. It should be noted that the selection of data sample groups g_1, g_2, and g_3 depends on actual design considerations.

Figure 6:
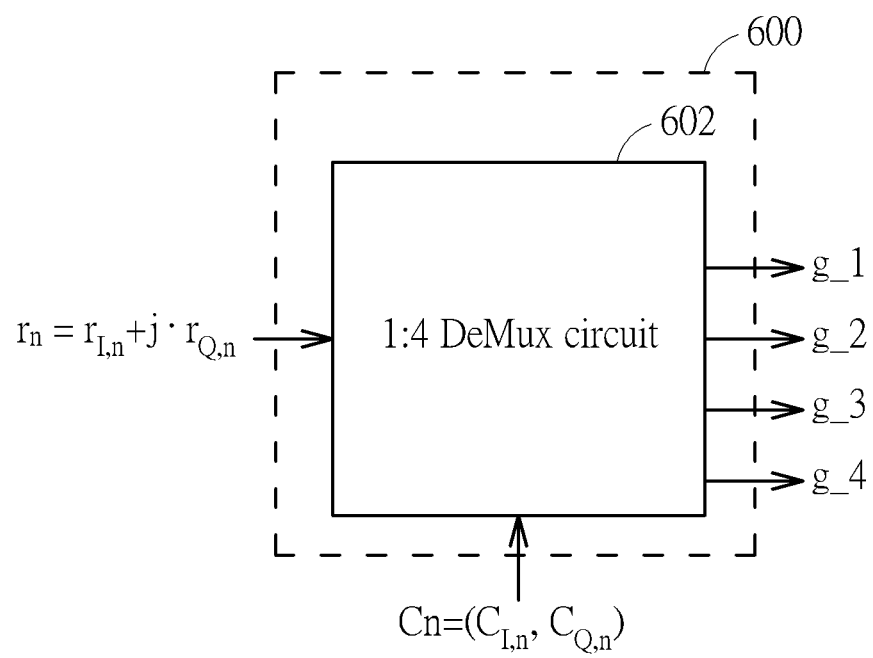
FIG. 6 is a diagram illustrating a fourth grouping circuit design according to an embodiment of the present invention.

FIG. 6 is a diagram illustrating a fourth grouping circuit design according to an embodiment of the present invention. The grouping circuit 102 shown in FIG. 1 may be implemented by the grouping circuit 600 shown in FIG. 6, where the grouping circuit 600 includes a 1:4 demultiplexer (De-Mux) circuit 602. In this embodiment, the number of data sample groups g_1-g_M is equal to four (M=4). Hence, for each data sample $r_n$ included in the data sequence $\{r_n, n=0, 1, \ldots, N-1\}$, the 1:4 DeMux circuit 602 checks a pair of an in-phase code bit $C_{I,n}$ and a quadrature code bit $C_{Q,n}$ corresponding to the data sample $r_n$ to determine whether to categorize the data sample $r_n$ into one of four data sample groups g_1, g_2, g_3, and g_4 for accumulation, wherein the in-phase code bit $C_{I,n}$ is included in the in-phase code sequence $\{C_{I,n}, n=0, 1, \ldots, N-1\}$, and the quadrature code bit $C_{Q,n}$ is included in the quadrature code sequence $\{C_{Q,n}, n=0, 1, \ldots, N-1\}$. The data sample groups g_1, g_2, g_3, and g_4 may be the data sample group g0, g1, g2, and g3 illustrated in FIG. 3. By way of example, but not limitation, all data samples included in the data sequence $\{r_n, n=0, 1, \ldots, N-1\}$ are demultiplexed by the grouping operation performed by the 1:4 DeMux circuit 602, such that each data sample included in the data sequence $\{r_n, n=0, 1, \ldots, N-1\}$ is categorized into one of four data sample groups g0, g1, g2, and g3.

Figure 7:
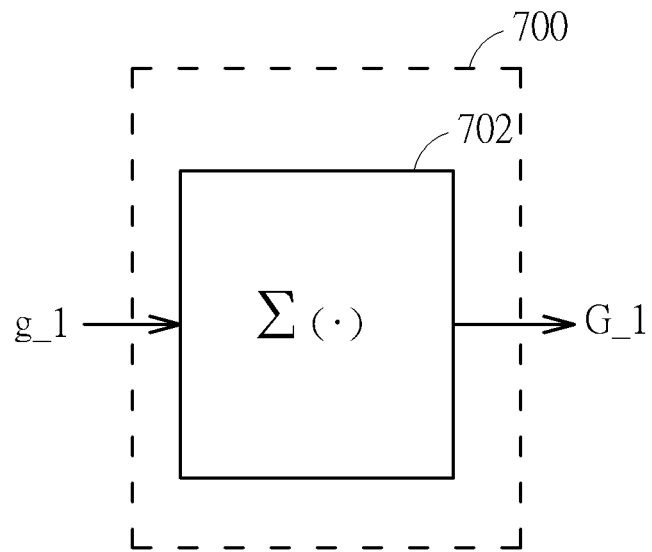
FIG. 7 is a diagram illustrating a first accumulation-based circuit design according to an embodiment of the present invention.

FIG. 7 is a diagram illustrating a first accumulation-based circuit design according to an embodiment of the present invention. The accumulation-based circuit 104 shown in FIG. 1 may be implemented by the accumulation-based circuit 700 shown in FIG. 7, where the accumulation-based circuit 700 includes one accumulator (labeled by "Σ(·)") 702. In this embodiment, the number of data sample groups g_1-g_M is equal to one (M=1), and the number of accumulation results G_1-G_K is equal to one (K=1). For example, the data sample group g_1 may be any of the data sample groups g0, g1, g2, and g3 illustrated in FIG. 3. The accumulator 702 is arranged to generate the accumulation result G_1 by performing an accumulation operation upon data samples categorized into the same data sample group g_1 only.

Figure 8:
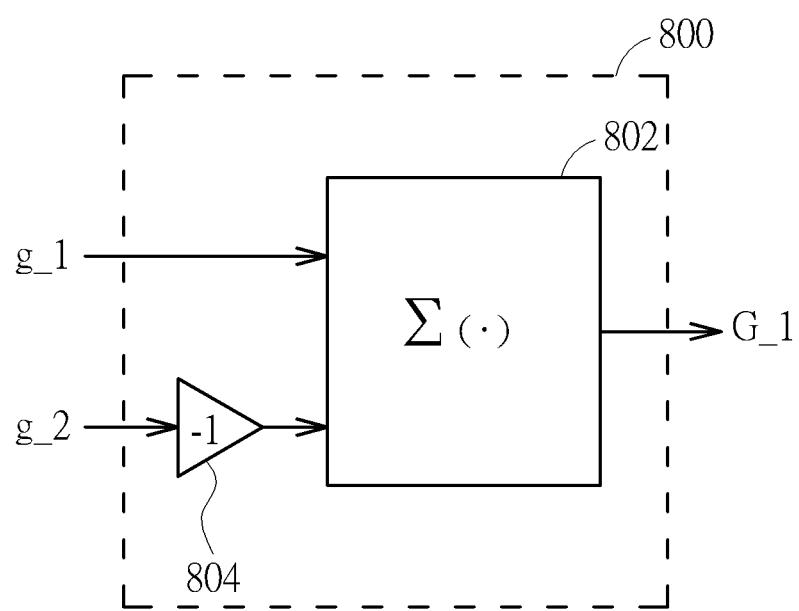
FIG. 8 is a diagram illustrating a second accumulation-based circuit design according to an embodiment of the present invention.

FIG. 8 is a diagram illustrating a second accumulation-based circuit design according to an embodiment of the present invention. The accumulation-based circuit 104 shown in FIG. 1 may be implemented by the accumulation-based circuit 800 shown in FIG. 8, where the accumulation-based circuit 800 includes one accumulator (labeled by "Σ(·)") 802 and one multiplier 804. Each of the data samples categorized into one data sample group g_1 is accumulated by an accumulation operation at the accumulator 802. Each of the data samples categorized into the other data sample group g_2 is first multiplied by a predetermined factor (e.g., −1) at the multiplier 804 and then accumulated by an accumulation operation at the accumulator 802. In this embodiment, the number of data sample groups g_1-g_M is equal to two (M=2), the number of accumulation results G_1-G_K is equal to one (K=1), and there is a 180-degree phase difference between the data sample groups g_1 and g_2. The accumulation result output from the accumulation-based circuit 800 (particularly, accumulator 802 of accumulation-based circuit 800) may be represented by G_1=g_1−g_2. For example, two data sample groups g_1 and g_2 may be set by the data sample groups g0 and g3 illustrated in FIG. 3, or may be set by the data sample groups g1 and g2 illustrated in FIG. 3.

Figure 9:
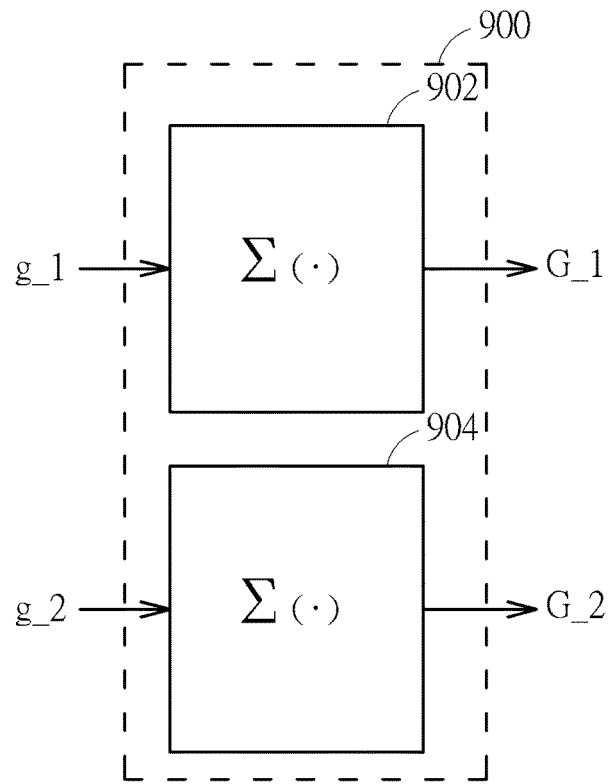
FIG. 9 is a diagram illustrating a third accumulation-based circuit design according to an embodiment of the present invention.

FIG. 9 is a diagram illustrating a third accumulation-based circuit design according to an embodiment of the present invention. The accumulation-based circuit 104 shown in FIG. 1 may be implemented by the accumulation-based circuit 900 shown in FIG. 9, where the accumulation-based circuit 900 includes two accumulators (labeled by "Σ(·)") 902 and 904. Each of the data samples categorized into one data sample group g_1 is accumulated by an accumulation operation at the accumulator 902. Each of the data samples categorized into the other data sample group g_2 is accumulated by an accumulation operation at the accumulator 904. In this embodiment, the number of data sample groups g_1-g_M is equal to two (M=2), and the number of accumulation results G_1-G_K is equal to two (K=2). Specifically, the accumulation result G_1 is derived from an accumulation operation performed upon data samples categorized into the data sample group g_1, and the accumulation result G_2 is derived from an accumulation operation performed upon data samples categorized into the data sample group g_2. For example, two data sample groups g_1 and g_2 may be set by the data sample groups g0 and g2 illustrated in FIG. 3, or may be set by the data sample groups g0 and g1 illustrated in FIG. 3. It should be noted that the selection of the data sample groups g_1 and g_2 depends on actual design considerations.

Figure 10:
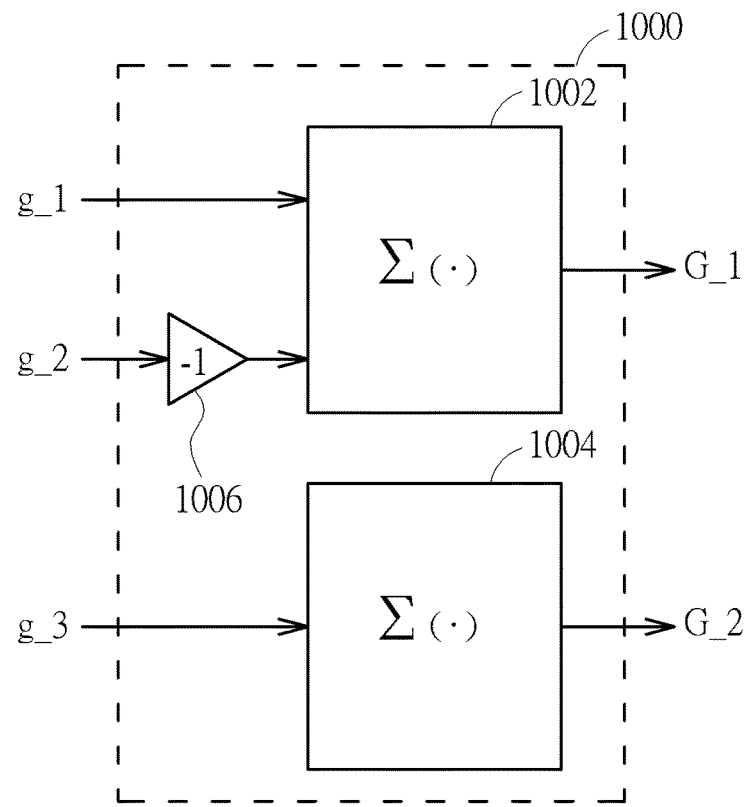
FIG. 10 is a diagram illustrating a fourth accumulation-based circuit design according to an embodiment of the present invention.

FIG. 10 is a diagram illustrating a fourth accumulation-based circuit design according to an embodiment of the present invention. The accumulation-based circuit 104 shown in FIG. 1 may be implemented by the accumulation-based circuit 1000 shown in FIG. 10, where the accumulation-based circuit 1000 includes two accumulators (labeled by "Σ(·)") 1002, 1004 and one multiplier 1006. Each of the data samples categorized into the data sample group g_1 is accumulated by an accumulation operation at the accumulator 1002. Each of the data samples categorized into the data sample group g_2 is first multiplied by a predetermined factor (e.g., −1) at the multiplier 1006 and then accumulated by the accumulation operation at the accumulator 1002. Each of the data samples categorized into the data sample group g_3 is accumulated by an accumulation operation at the accumulator 1004. In this embodiment, the number of data sample groups g_1-g_M is equal to three (M=3), the number of accumulation results G_1-G_K is equal to two (K=2), and there is a 180-degree phase difference between the data sample groups g_1 and g_2. The accumulation result output from the accumulator 1002 may be represented by G_1=g_1−g_2. The accumulation result G_2 is derived from an accumulation operation performed upon data samples categorized into the data sample group g_3. For example, data sample groups g_1 and g_2 may be set by the data sample groups g0 and g3 illustrated in FIG. 3, and the data sample group g_3 may be set by the data sample group g2 illustrated in FIG. 3. It should be noted that the selection of data sample groups g_1, g_2, and g_3 depends on actual design considerations.

Figure 11:
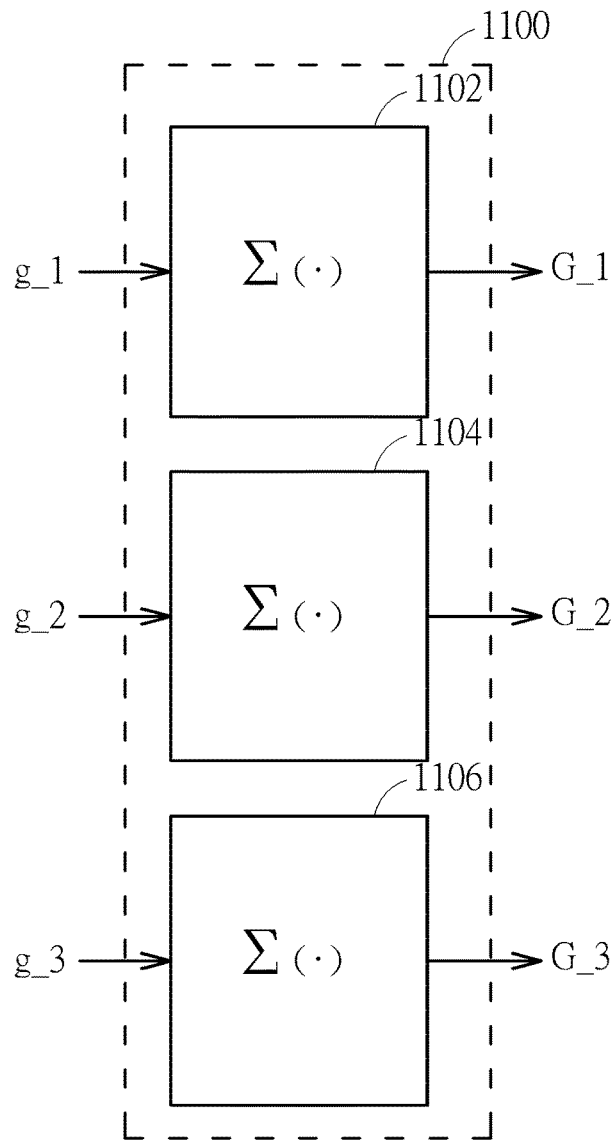
FIG. 11 is a diagram illustrating a fifth accumulation-based circuit design according to an embodiment of the present invention.

FIG. 11 is a diagram illustrating a fifth accumulation-based circuit design according to an embodiment of the present invention. The accumulation-based circuit 104 shown in FIG. 1 may be implemented by the accumulation-based circuit 1100 shown in FIG. 11, where the accumulation-based circuit 1100 includes three accumulators (labeled by "Σ(·)") 1102, 1104, and 1106. Each of the data samples categorized into the data sample group g_1 is accumulated by an accumulation operation at the accumulator 1102. Each of the data samples categorized into the data sample group g_2 is accumulated by an accumulation operation at the accumulator 1104. Each of the data samples categorized into the data sample group g_3 is accumulated by an accumulation operation at the accumulator 1106. In this embodiment, the number of data sample groups g_1-g_M is equal to three (M=3), and the number of accumulation results G_1-G_K is equal to three (K=3). Specifically, the accumulation result G_1 is derived from an accumulation operation performed upon data samples categorized into the data sample group g_1, the accumulation result G_2 is derived from an accumulation operation performed upon data samples categorized into the data sample group g_2, and the accumulation result G_3 is derived from an accumulation operation performed upon data samples categorized into the data sample group g_3. For example, three data sample groups g_1, g_2, and g_3 may be set by the data sample groups g0, g2, and g3 illustrated in FIG. 3. It should be noted that the selection of data sample groups g_1, g_2, and g_3 depends on actual design considerations.

Figure 12:
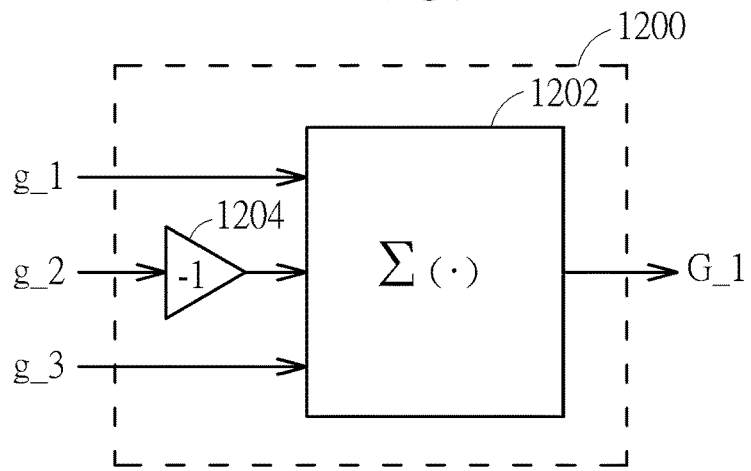
FIG. 12 is a diagram illustrating a sixth accumulation-based circuit design according to an embodiment of the present invention.

FIG. 12 is a diagram illustrating a sixth accumulation-based circuit design according to an embodiment of the present invention. The accumulation-based circuit 104 shown in FIG. 1 may be implemented by the accumulation-based circuit 1200 shown in FIG. 12, where the accumulation-based circuit 1200 includes one accumulator (labeled by "Σ(·)") 1202 and one multiplier 1204. Each of the data samples categorized into the data sample group g_1 is accumulated by an accumulation operation at the accumulator 1202. Each of the data samples categorized into the data sample group g_2 is first multiplied by a predetermined factor (e.g., −1) at the multiplier 1204 and then accumulated by the accumulation operation at the accumulator 1202. Each of the data samples categorized into the data sample group g_3 is accumulated by the accumulation operation at the accumulator 1202. In this embodiment, the number of data sample groups g_1-g_M is equal to three (M=3), the number of accumulation results G_1-G_K is equal to one (K=1), and there is a 180-degree phase difference between the data sample groups g_1 and g_2. The accumulation result output from the accumulator 1202 may be represented by G_1=g_1−g_2+g_3. For example, data sample groups g_1 and g_2 may be set by the data sample groups g0 and g3 illustrated in FIG. 3, and the data sample group g_3 may be set by the data sample group g2 illustrated in FIG. 3. It should be noted that the selection of data sample groups g_1, g_2, and g_3 depends on actual design considerations.

Figure 13:
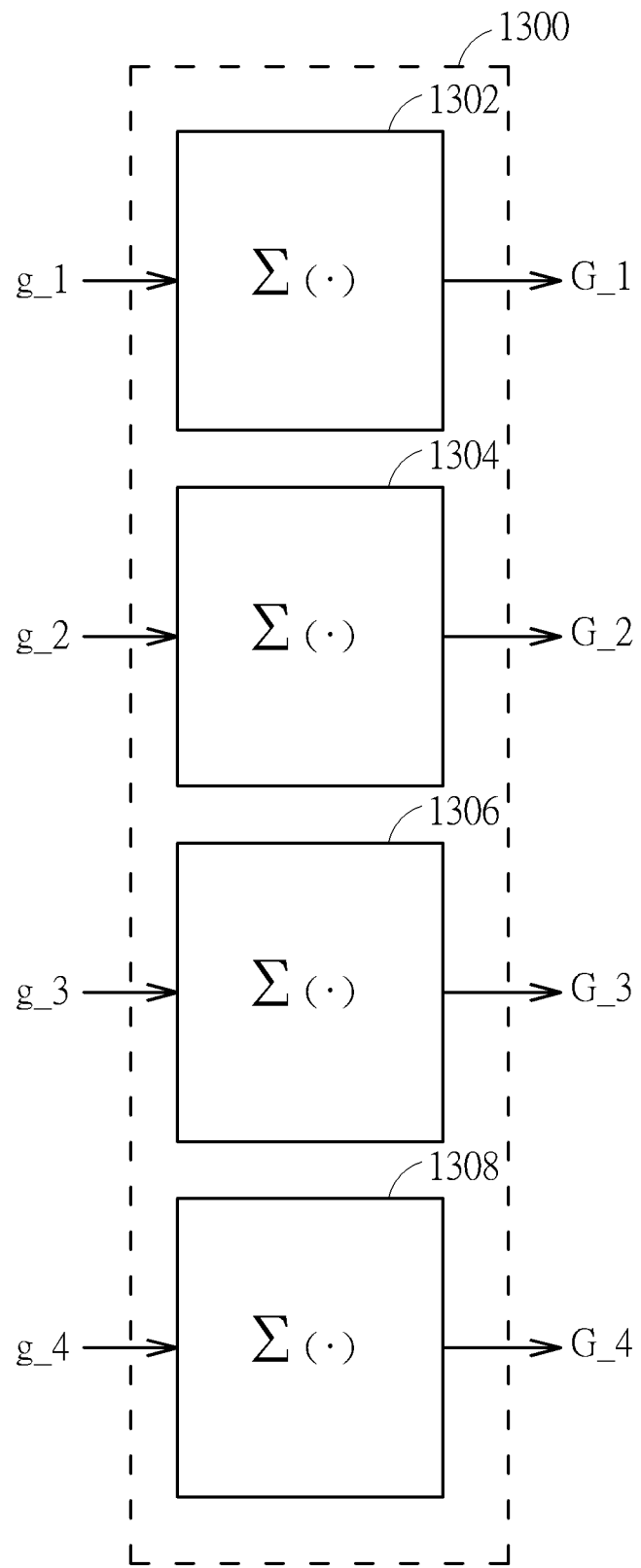
FIG. 13 is a diagram illustrating a seventh accumulation-based circuit design according to an embodiment of the present invention.

FIG. 13 is a diagram illustrating a seventh accumulation-based circuit design according to an embodiment of the present invention. The accumulation-based circuit 104 shown in FIG. 1 may be implemented by the accumulation-based circuit 1300 shown in FIG. 13, where the accumulation-based circuit 1300 includes four accumulators (labeled by "Σ(·)") 1302, 1304, 1306, and 1308. Each of the data samples categorized into the data sample group g_1 is accumulated by an accumulation operation at the accumulator 1302. Each of the data samples categorized into the data sample group g_2 is accumulated by an accumulation operation at the accumulator 1304. Each of the data samples categorized into the data sample group g_3 is accumulated by an accumulation operation at the accumulator 1306. Each of the data samples categorized into the data sample group g_4 is accumulated by an accumulation operation at the accumulator 1308. In this embodiment, the number of data sample groups g_1-g_M is equal to four (M=4), and the number of accumulation results G_1-G_K is equal to four (K=4). Specifically, the accumulation result G_1 is derived from an accumulation operation performed upon data samples categorized into the data sample group g_1, the accumulation result G_2 is derived from an accumulation operation performed upon data samples categorized into the data sample group g_2, the accumulation result G_3 is derived from an accumulation operation performed upon data samples categorized into the data sample group g_3, and the accumulation result G_4 is derived from an accumulation operation performed upon data samples categorized into the data sample group g_4. For example, four data sample groups g_1, g_2, g_3, g_4 may be set by the data sample groups g0, g1, g2, and g3 illustrated in FIG. 3.

Figure 14:
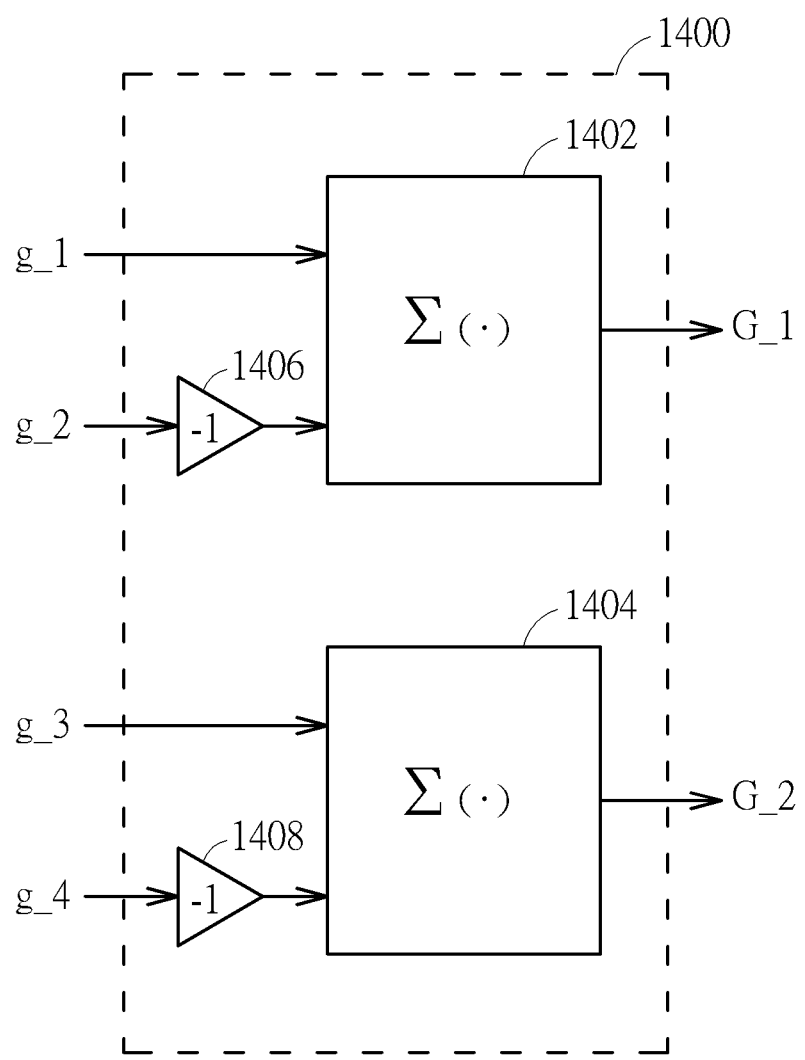
FIG. 14 is a diagram illustrating an eighth accumulation-based circuit design according to an embodiment of the present invention.

FIG. 14 is a diagram illustrating an eighth accumulation-based circuit design according to an embodiment of the present invention. The accumulation-based circuit 104 shown in FIG. 1 may be implemented by the accumulation-based circuit 1400 shown in FIG. 14, where the accumulation-based circuit 1400 includes two accumulators (labeled by "Σ(·)") 1402, 1404 and two multipliers 1406, 1408. Each of the data samples categorized into the data sample group g_1 is accumulated by an accumulation operation at the accumulator 1402. Each of the data samples categorized into the data sample group g_2 is first multiplied by a predetermined factor (e.g., −1) at the multiplier 1406 and then accumulated by the accumulation operation at the accumulator 1402. Each of the data samples categorized into the data sample group g_3 is accumulated by an accumulation operation at the accumulator 1404. Each of the data samples categorized into the data sample group g_4 is first multiplied by a predetermined factor (e.g., −1) at the multiplier 1408 and then accumulated by the accumulation operation at the accumulator 1404. In this embodiment, the number of data sample groups g_1-g_M is equal to four (M=4), the number of accumulation results G_1-G_K is equal to two (K=2), there is a 180-degree phase difference between the data sample groups g_1 and g_2, and there is a 180-degree phase difference between the data sample groups g_3 and g_4. The accumulation result output from the accumulator 1402 may be represented by G_1=g_1−g_2. The accumulation result output from the accumulator 1404 may be represented by G_2=g_3−g_4. For example, data sample groups g_1 and g_2 may be set by the data sample groups g0 and g3 illustrated in FIG. 3, and data sample groups g_3 and g_4 may be set by the data sample groups g1 and g2 illustrated in FIG. 3.

Figure 15:
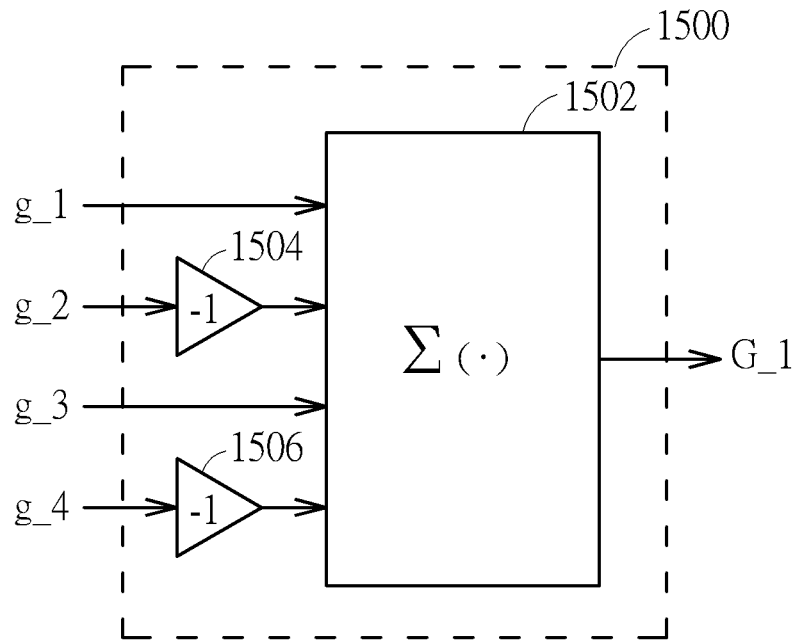
FIG. 15 is a diagram illustrating a ninth accumulation-based circuit design according to an embodiment of the present invention.

FIG. 15 is a diagram illustrating a ninth accumulation-based circuit design according to an embodiment of the present invention. The accumulation-based circuit 104 shown in FIG. 1 may be implemented by the accumulation-based circuit 1500 shown in FIG. 15, where the accumulation-based circuit 1500 includes one accumulator (labeled by "Σ(·)") 1502 and two multipliers 1504, 1506. Each of the data samples categorized into the data sample group g_1 is accumulated by an accumulation operation at the accumulator 1502. Each of the data samples categorized into the data sample group g_2 is first multiplied by a predetermined factor (e.g., −1) at the multiplier 1504 and then accumulated by the accumulation operation at the accumulator 1502. Each of the data samples categorized into the data sample group g_3 is accumulated by the accumulation operation at the accumulator 1502. Each of the data samples categorized into the data sample group g_4 is first multiplied by a predetermined factor (e.g., −1) at the multiplier 1506 and then accumulated by the accumulation operation at the accumulator 1502. In this embodiment, the number of data sample groups g_1-g_M is equal to four (M=4), the number of accumulation results G_1-G_K is equal to one (K=1), there is a 180-degree phase difference between the data sample groups g_1 and g_2, and there is a 180-degree phase difference between the data sample groups g_3 and g_4. The accumulation result output from the accumulator 1502 may be represented by G_1=g_1−g_2+g_3−g_4. For example, data sample groups g_1 and g_2 may be set by the data sample groups g0 and g3 illustrated in FIG. 3, and data sample groups g_3 and g_4 may be set by the data sample groups g1 and g2 illustrated in FIG. 3.

Figure 16:
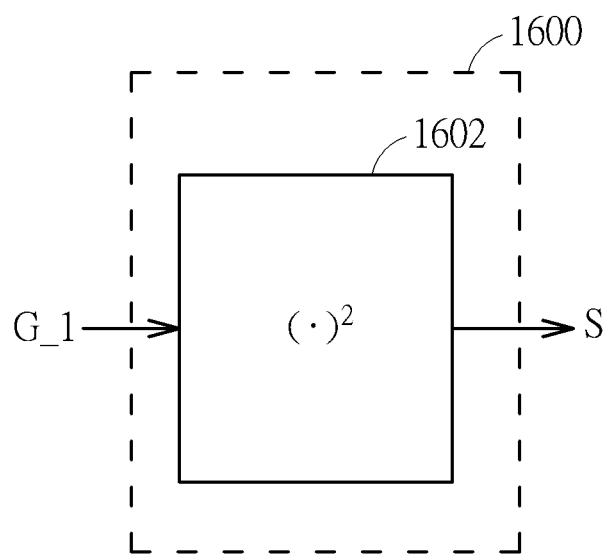
FIG. 16 is a diagram illustrating a first processing circuit design according to an embodiment of the present invention.

FIG. 16 is a diagram illustrating a first processing circuit design according to an embodiment of the present invention. The processing circuit 106 shown in FIG. 1 may be implemented by the processing circuit 1600 shown in FIG. 16, where the processing circuit 1600 includes one mathematical manipulation circuit (labeled by "(·)$^2$") 1602. In this embodiment, the number of accumulation results G_1-G_K is equal to one (K=1). The mathematical manipulation circuit 1602 is arranged to set the correlation value S by a mathematical manipulation value of the accumulation result G_1. For example, the correlation value S is set by a square of the accumulation result (which is a complex number) G_1. Alternatively, the correlation value S may be set by the magnitude of the accumulation result (which is a complex number) G_1 (i.e., S=|G_1|).

Figure 17:
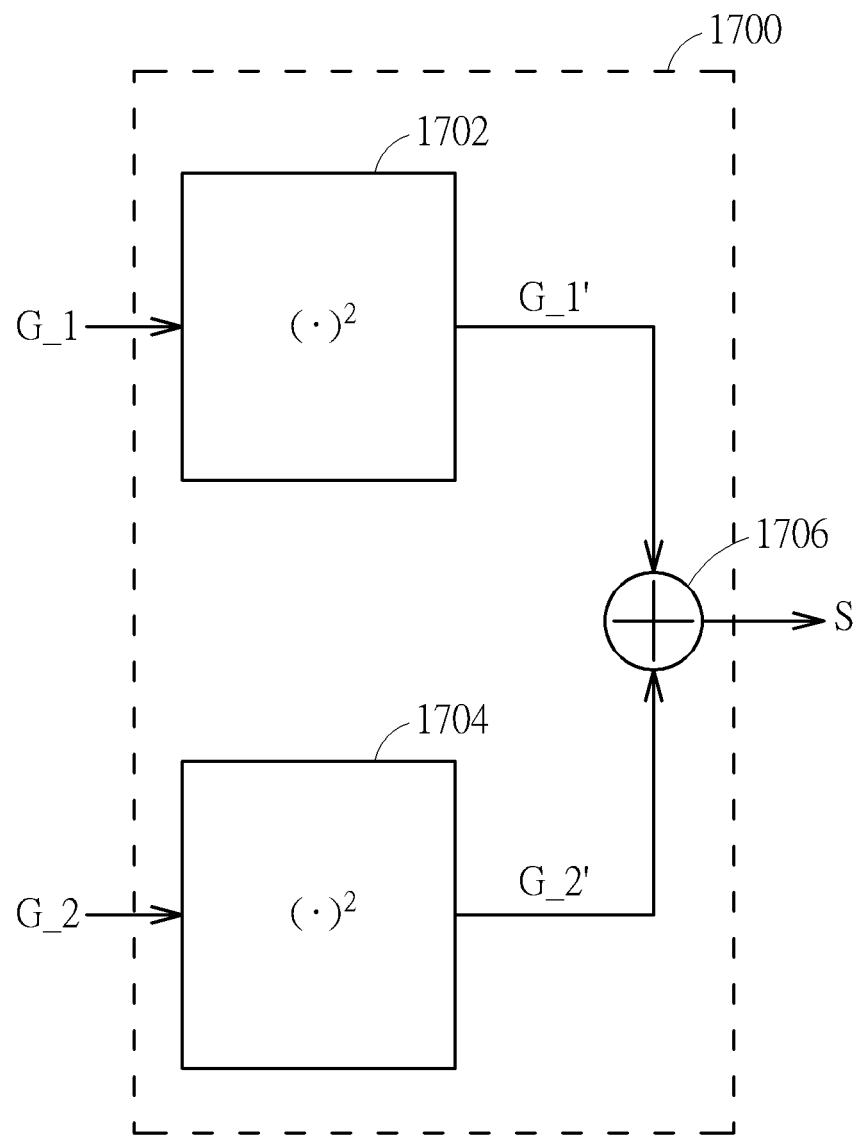
FIG. 17 is a diagram illustrating a second processing circuit design according to an embodiment of the present invention.

FIG. 17 is a diagram illustrating a second processing circuit design according to an embodiment of the present invention. The processing circuit 106 shown in FIG. 1 may be implemented by the processing circuit 1700 shown in FIG. 17, where the processing circuit 1700 includes two mathematical manipulation circuits (labeled by "(·)$^2$") 1702, 1704 and one adder 1706. In this embodiment, the number of accumulation results G_1-G_K is equal to two (K=2). The processing circuit 1700 may be used to perform non-coherent group combining. The mathematical manipulation circuit 1702 is arranged to generate a mathematical manipulation value G_1' according to the accumulation result G_1. The mathematical manipulation circuit 1704 is arranged to generate a mathematical manipulation value G_2' according to the accumulation result G_2. The adder 1706 is arranged to set the correlation value S by a sum of the mathematical manipulation values G_1' and G_2'. For example, the mathematical manipulation value G_1' is a square of the accumulation result (which is a complex number) G_1, and the mathematical manipulation value G_2' is a square of the accumulation result (which is a complex number) G_2. Alternatively, the mathematical manipulation value G_1' may be the magnitude of the accumulation result (which is a complex number) G_1 (i.e., G_1'=|G_1|), and the mathematical manipulation value G_2' may be the magnitude of the accumulation result (which is a complex number) G_2 (i.e., G_2'=|G_2|).

Figure 18:
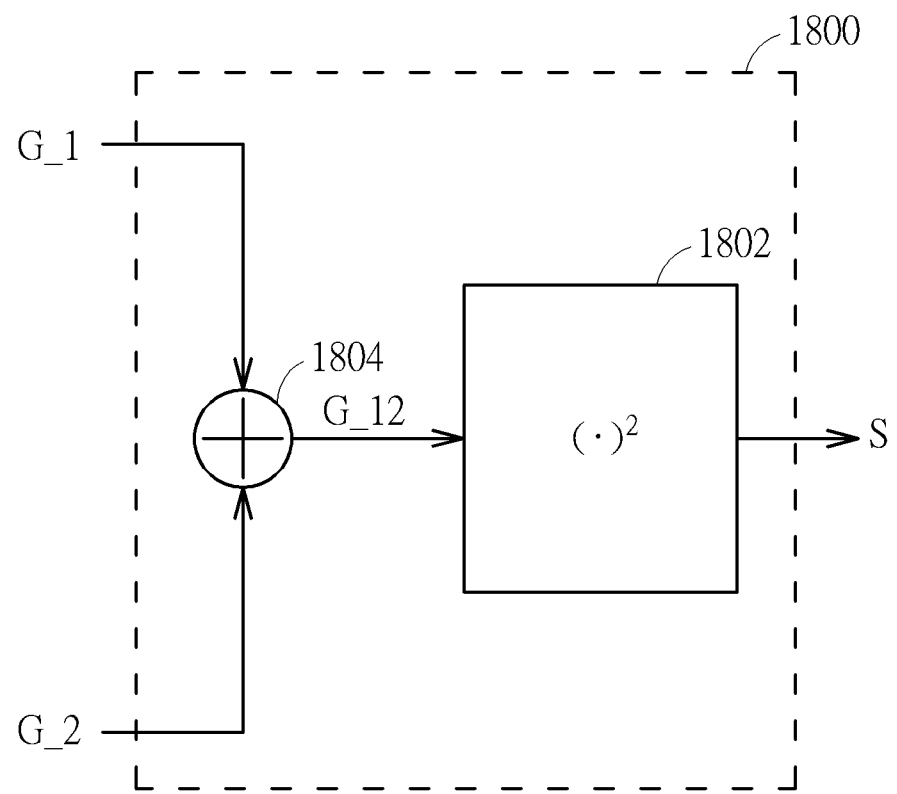
FIG. 18 is a diagram illustrating a third processing circuit design according to an embodiment of the present invention.

FIG. 18 is a diagram illustrating a third processing circuit design according to an embodiment of the present invention. The processing circuit 106 shown in FIG. 1 may be implemented by the processing circuit 1800 shown in FIG. 18, where the processing circuit 1800 includes one mathematical manipulation circuit (labeled by "(·)$^2$") 1802 and one adder 1804. In this embodiment, the number of accumulation results G_1-G_K is equal to two (K=2). The processing circuit 1800 may be used to perform coherent and non-coherent group combining. The adder 1804 is arranged to generate a sum G_12 of the accumulation results G_1 and G_2. The mathematical manipulation circuit 1802 is arranged to set the correlation value S by a mathematical manipulation value of the sum G_12. For example, the correlation value S is set by a square of the sum (which is a complex number) G_12. Alternatively, the correlation value S may be set by the magnitude of the sum (which is a complex number) G_12 (i.e., S=|G_12|).

Figure 19:
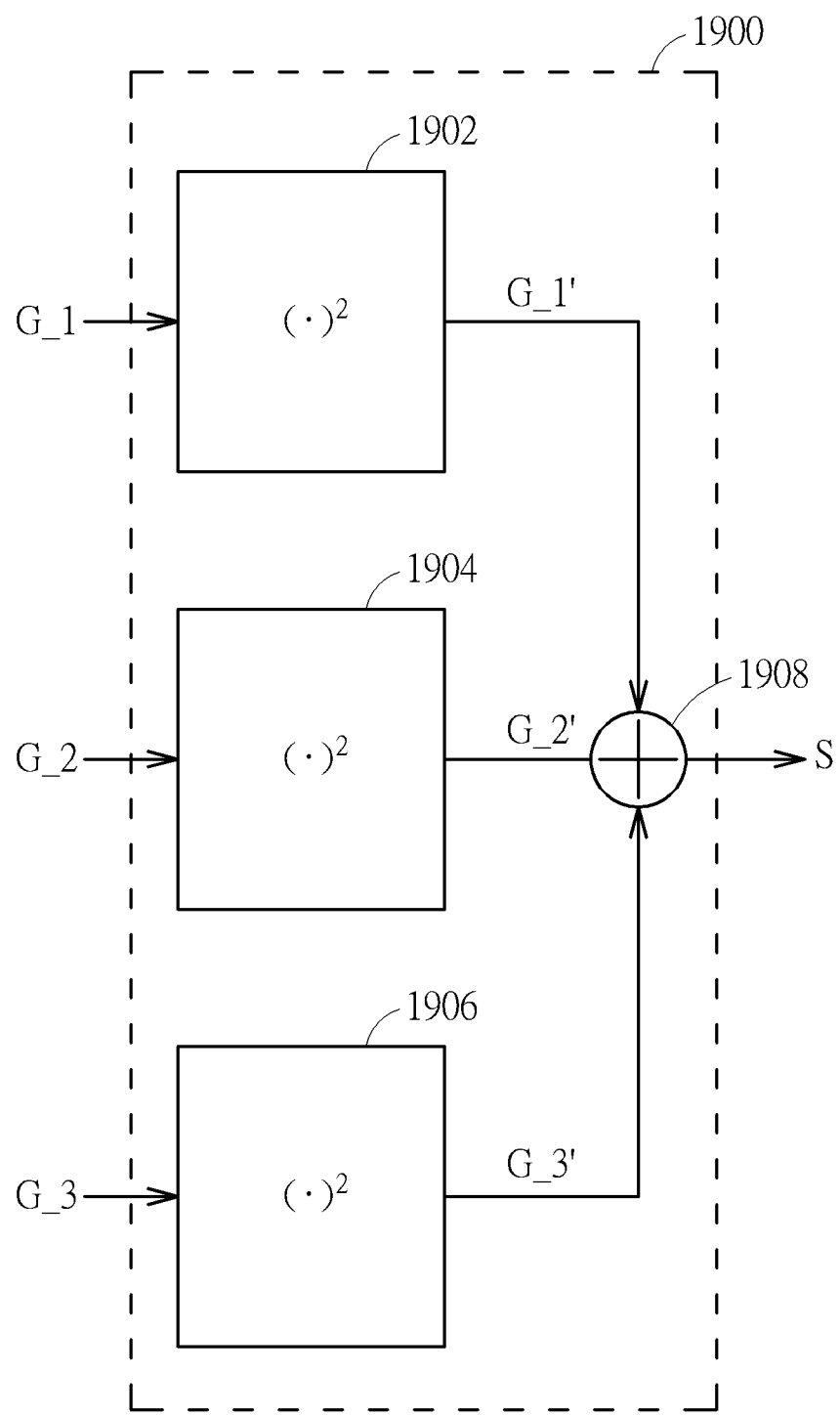
FIG. 19 is a diagram illustrating a fourth processing circuit design according to an embodiment of the present invention.

FIG. 19 is a diagram illustrating a fourth processing circuit design according to an embodiment of the present invention. The processing circuit 106 shown in FIG. 1 may be implemented by the processing circuit 1900 shown in FIG. 19, where the processing circuit 1900 includes three mathematical manipulation circuits (labeled by "(·)$^2$") 1902, 1904, 1906 and one adder 1908. In this embodiment, the number of accumulation results G_1-G_K is equal to three (K=3). The processing circuit 1900 may be used to perform non-coherent group combining. The mathematical manipulation circuit 1902 is arranged to generate a mathematical manipulation value G_1' according to the accumulation result G_1. The mathematical manipulation circuit 1904 is arranged to generate a mathematical manipulation value G_2' according to the accumulation result G_2. The mathematical manipulation circuit 1906 is arranged to generate a mathematical manipulation value G_3' according to the accumulation result G_3. The adder 1908 is arranged to set the correlation value S by a sum of the mathematical manipulation values G_1', G_2', and G_3'. For example, the mathematical manipulation value G_1' is a square of the accumulation result (which is a complex number) G_1, the mathematical manipulation value G_2' is a square of the accumulation result (which is a complex number) G_2, and the mathematical manipulation value G_3' is a square of the accumulation result (which is a complex number) G_3. Alternatively, the mathematical manipulation value G_1' may be the magnitude of the accumulation result (which is a complex number) G_1 (i.e., G_1'=|G_1|), the mathematical manipulation value G_2' may be the magnitude of the accumulation result (which is a complex number) G_2 (i.e., G_2'=|G_2|), and the mathematical manipulation value G_3' may be the magnitude of the accumulation result (which is a complex number) G_3 (i.e., G_3'=|G_3|).

Figure 20:
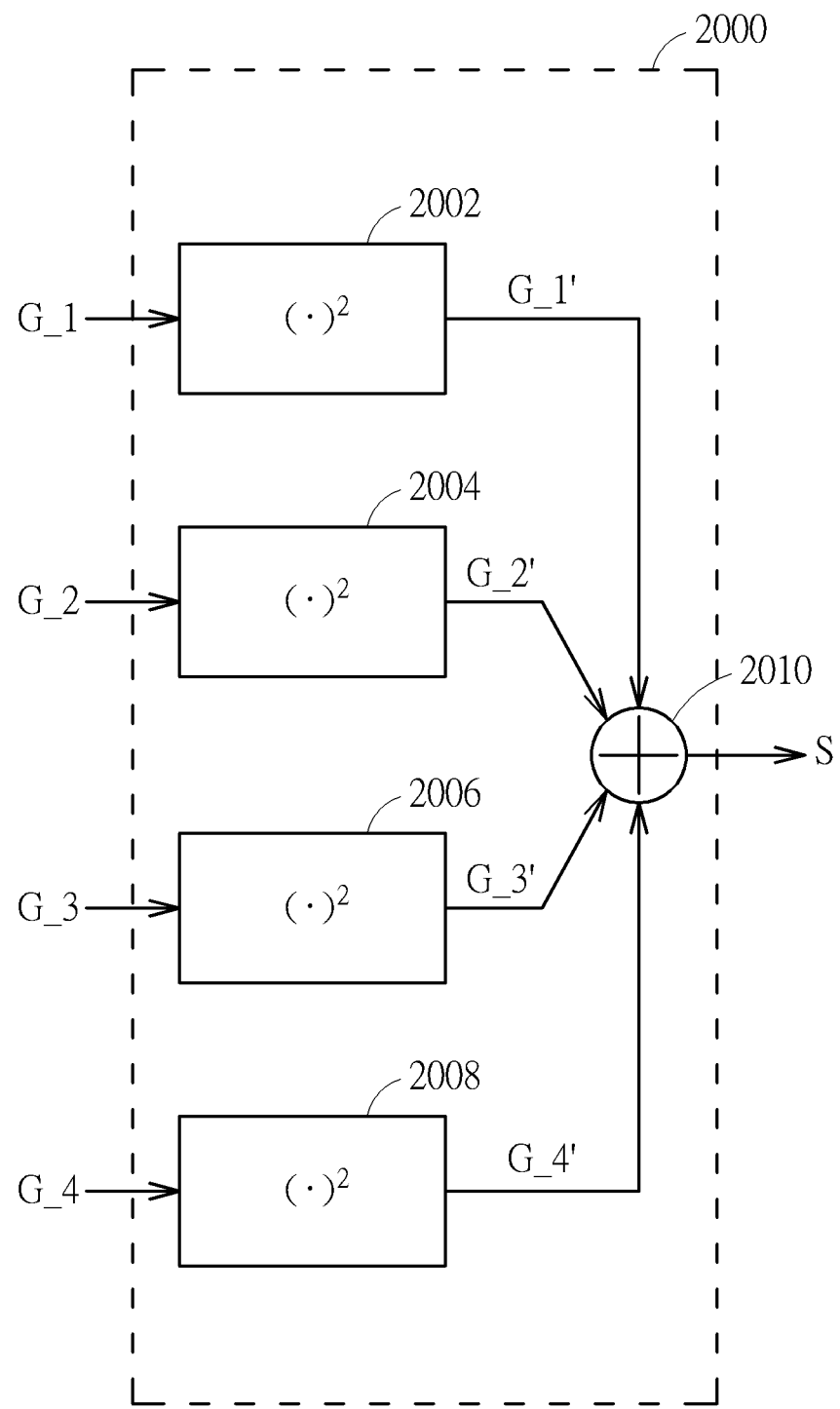
FIG. 20 is a diagram illustrating a fifth processing circuit design according to an embodiment of the present invention.

FIG. 20 is a diagram illustrating a fifth processing circuit design according to an embodiment of the present invention. The processing circuit 106 shown in FIG. 1 may be implemented by the processing circuit 2000 shown in FIG. 20, where the processing circuit 2000 includes four mathematical manipulation circuits (labeled by "(·)$^2$") 2002, 2004, 2006, 2008 and one adder 2010. In this embodiment, the number of accumulation results G_1-G_K is equal to four (K=4). The processing circuit 2000 may be used to perform non-coherent group combining. The mathematical manipulation circuit 2002 is arranged to generate a mathematical manipulation value G_1' according to the accumulation result G_1. The mathematical manipulation circuit 2004 is arranged to generate a mathematical manipulation value G_2' according to the accumulation result G_2. The mathematical manipulation circuit 2006 is arranged to generate a mathematical manipulation value G_3' according to the accumulation result G_3. The mathematical manipulation circuit 2008 is arranged to generate a mathematical manipulation value G_4' according to the accumulation result G_4. The adder 2010 is arranged to set the correlation value S by a sum of the mathematical manipulation values G_1', G_2', G_3', and G_4'. For example, the mathematical manipulation value G_1' is a square of the accumulation result (which is a complex number) G_1, the mathematical manipulation value G_2' is a square of the accumulation result (which is a complex number) G_2, the mathematical manipulation value G_3' is a square of the accumulation result (which is a complex number) G_3, and the mathematical manipulation value G_4' is a square of the accumulation result (which is a complex number) G_4. Alternatively, the mathematical manipulation value G_1' may be the magnitude of the accumulation result (which is a complex number) G_1 (i.e., G_1'=|G_1|), the mathematical manipulation value G_2' may be the magnitude of the accumulation result (which is a complex number) G_2 (i.e., G_2'=|G_2|), the mathematical manipulation value G_3' may be the magnitude of the accumulation result (which is a complex number) G_3 (i.e., G_3'=|G_3|), and the mathematical manipulation value G_4' may be the magnitude of the accumulation result (which is a complex number) G_4 (i.e., G_4'=|G_4|).

Figure 21:
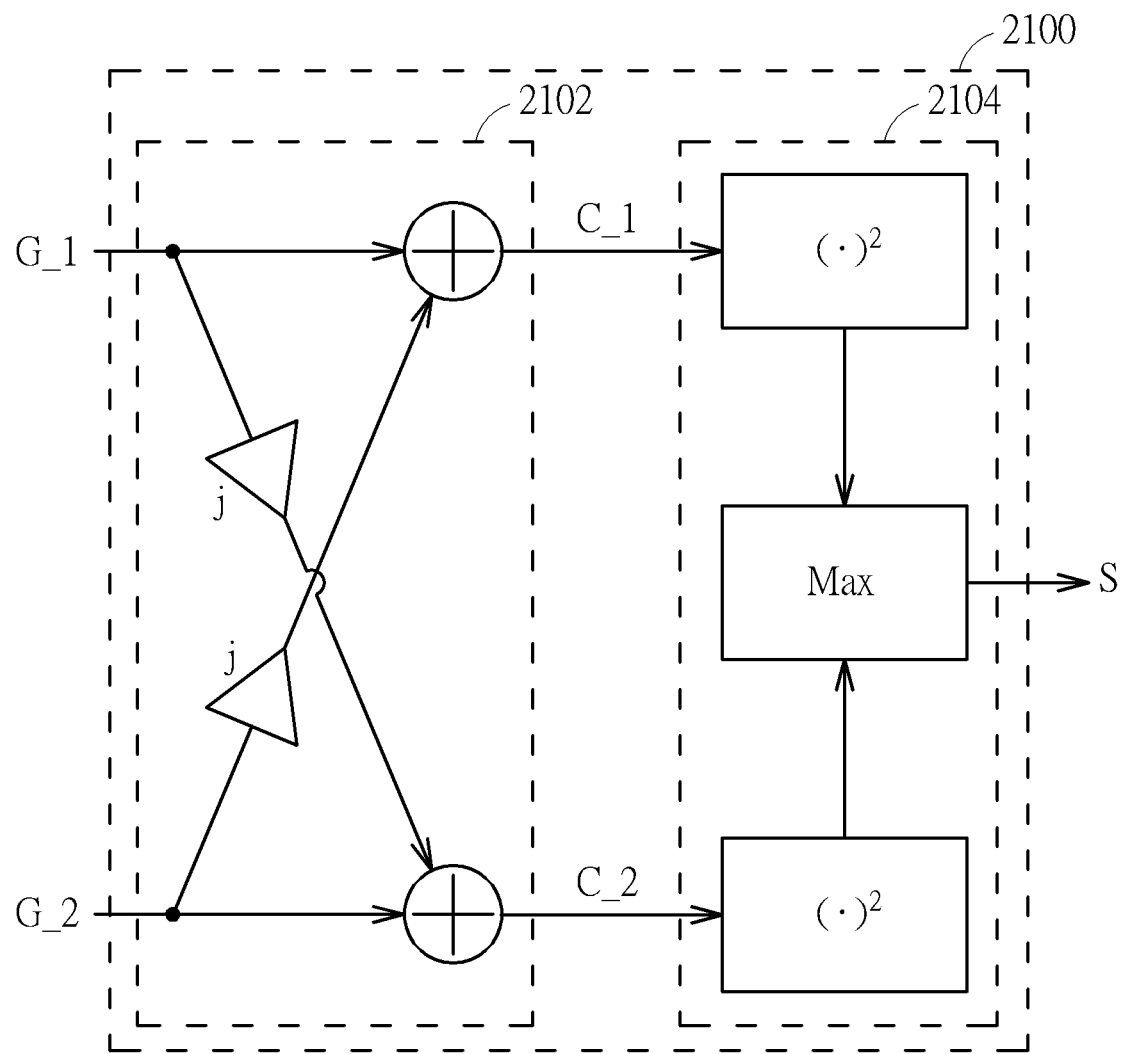
FIG. 21 is a diagram illustrating a sixth processing circuit design according to an embodiment of the present invention.

FIG. 21 is a diagram illustrating a sixth processing circuit design according to an embodiment of the present invention. The processing circuit 106 shown in FIG. 1 may be implemented by the processing circuit 2100 shown in FIG. 21, where the processing circuit 2100 includes two computation circuits 2102 and 2104. In this embodiment, the number of accumulation results G_1-G_K is equal to two (K=2). The processing circuit 2100 may be used to perform coherent group combining. Suppose that $G\_1=Ge=g0-g3$ and $G\_2=Go=g1-g2$. The computation circuit 2102 is arranged to generate one computation result $C\_1=G_e+jG_o$ and another computation result $C\_2=G_o+jG_e$. The phase relationship between complex numbers $G_e$ and G. depends on the data bits modulated on the I component and Q component. The relative phase of I component and Q component in QPSK modulation is determined not only by the PRN code chips but also by the data bits modulated on the I and Q components. In accordance with the relative data bit sign between the I and Q component, either C_1 or C_2 leads to the higher correlation value. That is, the relative sign of I and Q component data bits can be detected by the computation results C_1 and C_2. Based on the above observation, the computation circuit 2104 is arranged to set the correlation value S by a maximum among a square of the computation result (which is a complex number) C_1 and a square of the computation result (which is a complex number) C_2 (i.e., $S=\max\{C\_1^2, C\_2^2\}$). Of course, we can also use magnitude instead of square.

Figure 22:
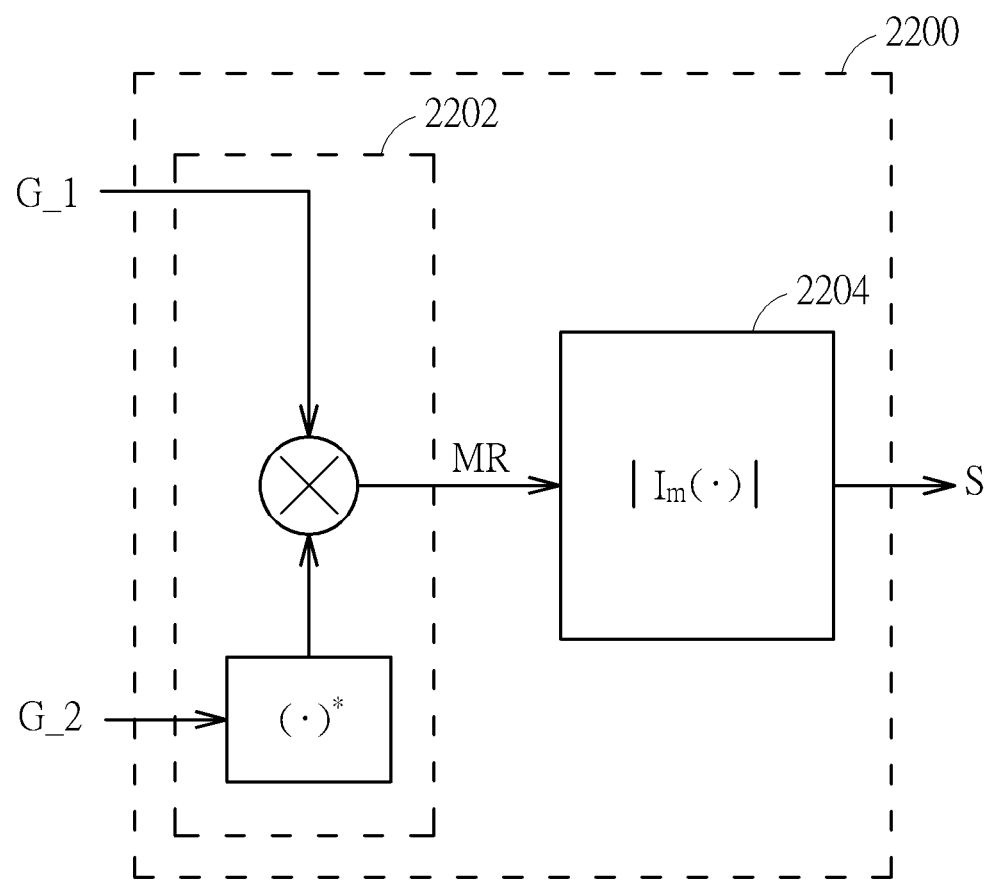
FIG. 22 is a diagram illustrating a seventh processing circuit design according to an embodiment of the present invention.

FIG. 22 is a diagram illustrating a seventh processing circuit design according to an embodiment of the present invention. The processing circuit 106 shown in FIG. 1 may be implemented by the processing circuit 2200 shown in FIG. 22, where the processing circuit 2200 includes two computation circuits 2202 and 2204. In this embodiment, the number of accumulation results G_1-G_K is equal to two (K=2). The processing circuit 2200 may be used to perform differentially coherent group combining. The computation circuit 2202 is arranged to generate a multiplication result MR through multiplying the accumulation result (which is a complex number) G_1 by a conjugate of the accumulation result (which is a complex number) G_2 (i.e., $MR=G\_1 \cdot G\_2^*$). For example, the accumulation result G_1 is obtained from accumulating data samples categorized into the data sample group g0 illustrated in FIG. 3, and the accumulation result G_2 is obtained from accumulating data samples categorized into the data sample group g1 illustrated in FIG. 3. For another example, the accumulation result G_1 is obtained from data samples categorized into the data sample groups g0 and g3 illustrated in FIG. 3 (e.g., G_1=g0-g3), and the accumulation result G_2 is obtained from data samples categorized into the data sample group g2 illustrated in FIG. 3. For yet another example, the accumulation result G_1 is obtained from data samples categorized into the data sample groups g0 and g3 illustrated in FIG. 3 (e.g., G_1=g0-g3), and the accumulation result G_2 is obtained from data samples categorized into the data sample groups g1 and g2 illustrated in FIG. 3 (e.g., G_2=g1-g2). The computation circuit (labeled by "|Im(·)|") 2204 is arranged to derive the correlation value S from an imaginary part of the multiplication result MR. Specifically, the computation circuit 2204 sets the correlation value S by an absolute value of the imaginary part of the multiplication result MR.

Figure 23:
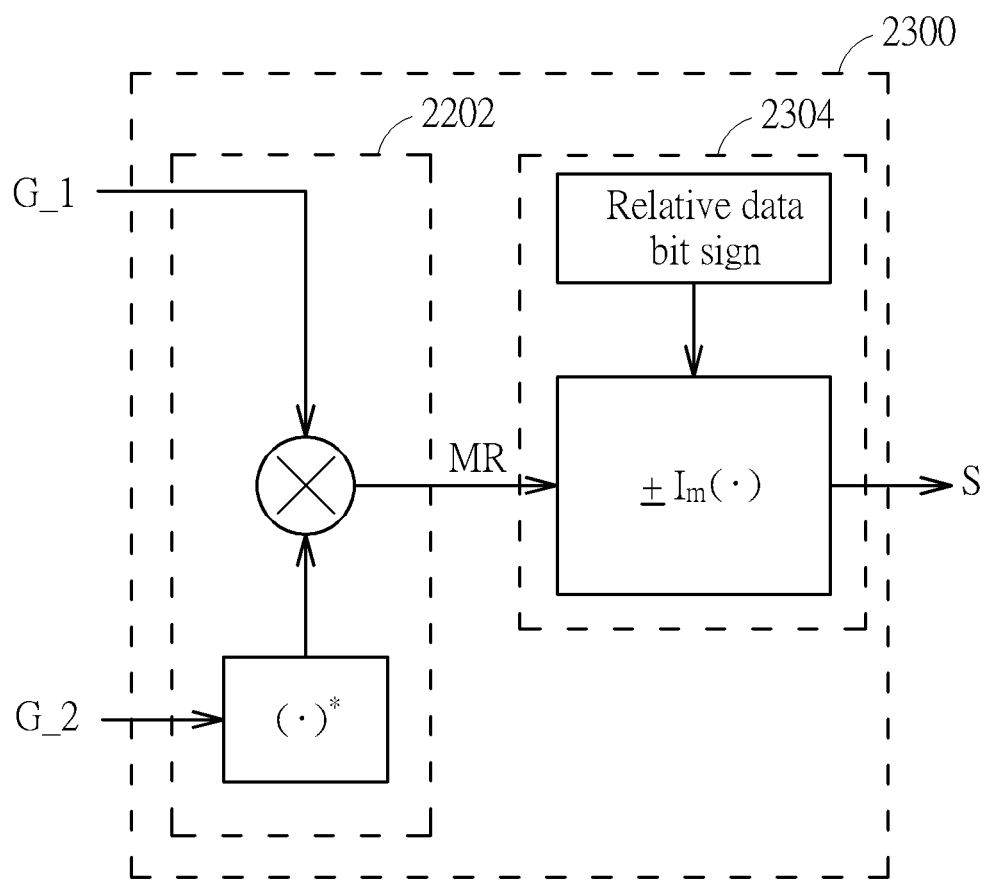
FIG. 23 is a diagram illustrating an eighth processing circuit design according to an embodiment of the present invention.

FIG. 23 is a diagram illustrating an eighth processing circuit design according to an embodiment of the present invention. The processing circuit 106 shown in FIG. 1 may be implemented by the processing circuit 2300 shown in FIG. 23, where the processing circuit 2300 includes two computation circuits 2202 and 2304. In this embodiment, the number of accumulation results G_1-G_K is equal to two (K=2). The processing circuit 2300 may be used to perform differentially coherent group combining. The major difference between the processing circuits 2200 and 2300 is that the computation circuit 2304 can omit an 'abs' operation needed by the computation circuit 2204 for calculating an absolute value of the imaginary part of the multiplication result MR. Specifically, the computation circuit 2304 is arranged to obtain relative data bit sign between the I component and the Q component, and refer to the relative data bit sign and the imaginary part of the multiplication result MR for setting the correlation value S. As mentioned above, the I component leads or lags the Q component when sign of I/Q data bits are the same or different. Hence, after the relative data bit sign between the I component and the Q component is known, the unsigned value of the imaginary part of the multiplication result MR can be obtained.

Figure 24:
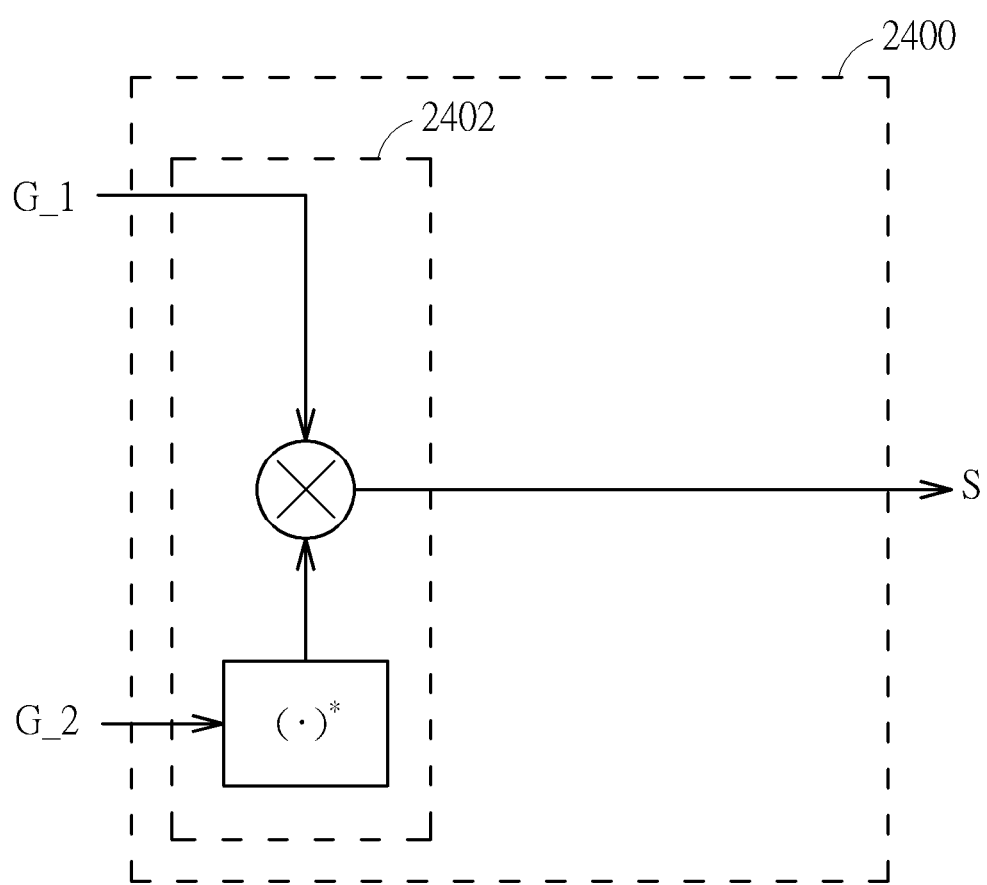
FIG. 24 is a diagram illustrating a ninth processing circuit design according to an embodiment of the present invention.

FIG. 24 is a diagram illustrating a ninth processing circuit design according to an embodiment of the present invention. The processing circuit 106 shown in FIG. 1 may be implemented by the processing circuit 2400 shown in FIG. 24, where the processing circuit 2400 includes one computation circuit 2402. In this embodiment, the number of accumulation results G_1-G_K is equal to two (K=2). The computation circuit 2402 is arranged to generate a multiplication result as the correlation value S through multiplying the accumulation result (which is a complex number) G_1 by a conjugate of the accumulation result (which is a complex number) G_2 (i.e., $S=G\_1 \cdot G\_2^*$). The correlation value S is insensitive to data bit sign change if suitable G_1 and G_2 are used. For example, the accumulation result G_1 is obtained from accumulating data samples categorized into the data sample group g0 illustrated in FIG. 3, and the accumulation result G_2 is obtained from accumulating data samples categorized into the data sample group g3 illustrated in FIG. 3. For another example, the accumulation result G_1 is obtained from data samples categorized into the data sample group g1 illustrated in FIG. 3, and the accumulation result G_2 is obtained from data samples categorized into the data sample group g2 illustrated in FIG. 3.

Figure 25:
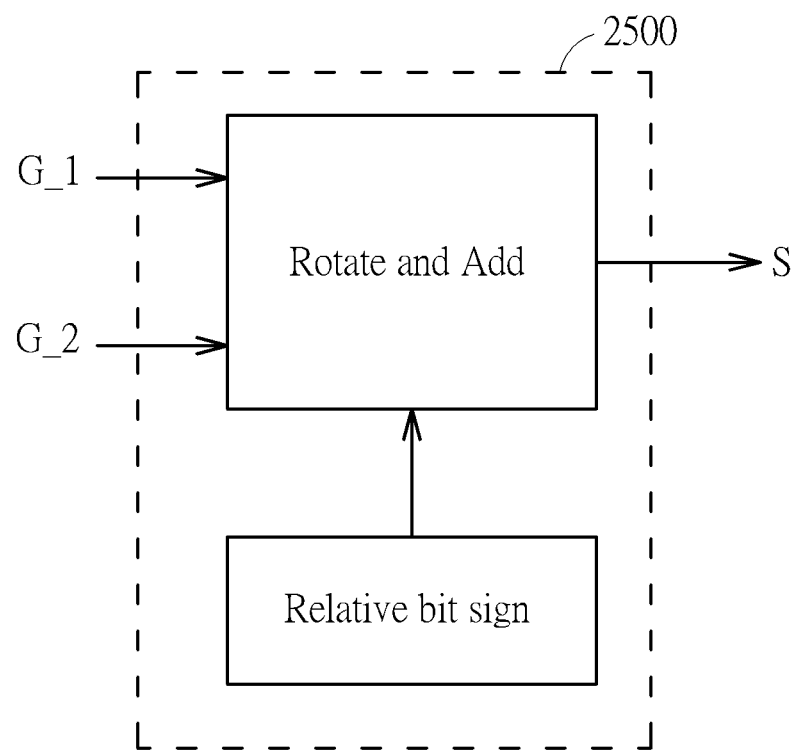
FIG. 25 is a diagram illustrating a tenth processing circuit design according to an embodiment of the present invention.

FIG. 25 is a diagram illustrating a tenth processing circuit design according to an embodiment of the present invention. The processing circuit 106 shown in FIG. 1 may be implemented by the processing circuit 2500 shown in FIG. 25. In this embodiment, the number of accumulation results G_1-G_K is equal to two (K=2). The processing circuit 2500 may be used to perform coherent group combining. For example, the accumulation result G_1 is obtained from data samples categorized into the data sample groups g0 and g3 illustrated in FIG. 3 (e.g., G_1=g0-g3), and the accumulation result G_2 is obtained from data samples categorized into the data sample groups g1 and g2 illustrated in FIG. 3 (e.g., G_2=g1-g2). As mentioned above, the I component leads or lags the Q component when sign of I/Q data bits are the same or different. In this embodiment, the processing circuit 2500 is arranged to obtain relative data bit sign between the I component and the Q component, and set the correlation value S by a combination of the accumulation results G_1 and G_2, where $S=a \cdot G\_1+b \cdot G\_2, a, b \in \{\pm 1, \pm j\}$. The coefficients (a, b) of the combination are determined based on the relative data bit sign. In other words, if sign of the I/Q data bits can be known, accumulation results G_1 and G_2 can be properly combined to use all useful QPSK signal power for generating the correlation value S.

In summary, the correlation computation apparatus 100 shown in FIG. 1 can be realized by a combination of the grouping circuit 102 (which may be implemented by one of the grouping circuits 200, 400, 500, 600), the accumulation-based circuit 104 (which may be implemented by one of the accumulation-based circuits 700, 800, 900, 1000, 1100, 1200, 1300, 1400, 1500), and the processing circuit 106 (which may be implemented by one of the processing circuits 1600, 1700, 1800, 1900, 2000, 2100, 2200, 2300, 2400, 2500). If a QPSK correlator of a GNSS receiver employs the proposed correlation computation apparatus 100 that uses the grouping circuit 200, only N/4 accumulations are required for obtaining the correlation result S. If a QPSK correlator of a GNSS receiver employs the proposed correlation computation apparatus 100 that uses the grouping circuit 400, only N/2 accumulations are required for obtaining the correlation result S. If a QPSK correlator of a GNSS receiver employs the proposed correlation computation apparatus 100 that uses the grouping circuit 500, only 3N/4 accumulations are required for obtaining the correlation result S. If a QPSK correlator of a GNSS receiver employs the proposed correlation computation apparatus 100 that uses the grouping circuit 600, only N accumulations are required for obtaining the correlation result S. Compared to the typical QPSK correlator design using BPSK channel combining (which requires 2N accumulations) and the typical QPSK correlator design using coherent QPSK combining (which requires 4N accumulations), the proposed QPSK correlator design can effectively reduce the complexity of correlation computation.

In above embodiments, accumulation of data samples may be performed in a series manner, such that a data sample is accumulated immediately after the data sample is available to an accumulator. However, this is for illustrative purposes only, and is not meant to be a limitation of the present invention. In practice, the present invention has no limitations on accumulation of data samples. For example, an accumulator of the accumulation-based circuit 104 may be configured to have one or more buffers for storing at least a portion (i.e., part or all) of data samples of one or more data sample groups, and does not start an accumulation operation upon data samples stored in the buffer(s) until the number of data samples in the buffer(s) reaches a predetermined threshold. This alternative design also falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A correlation computation method comprising:
performing, by a grouping circuit, a grouping operation upon a data sequence according to an in-phase code sequence and a quadrature code sequence, wherein the data sequence is derived from a quadrature phase shift keying (QPSK) modulated signal;
performing at least one accumulation operation upon data samples categorized into at least one data sample group by the grouping operation, to generate at least one accumulation result; and
deriving a correlation value between the data sequence and both of the in-phase code sequence and the quadrature code sequence from said at least one accumulation result.

2. The correlation computation method of claim 1, wherein performing the grouping operation upon the data sequence according to the in-phase code sequence and the quadrature code sequence comprises:
for each data sample included in the data sequence, checking a pair of an in-phase code bit and a quadrature code bit corresponding to the data sample to determine whether to categorize the data sample into a same single data sample group for accumulation, wherein the in-phase code bit is included in the in-phase code sequence, and the quadrature code bit is included in the quadrature code sequence.

3. The correlation computation method of claim 1, wherein performing the grouping operation upon the data sequence according to the in-phase code sequence and the quadrature code sequence comprises:
for each data sample included in the data sequence, checking a pair of an in-phase code bit and a quadrature code bit corresponding to the data sample to determine whether to categorize the data sample into one of a plurality of data sample groups, wherein the in-phase code bit is included in the in-phase code sequence, and the quadrature code bit is included in the quadrature code sequence.

4. The correlation computation method of claim 3, wherein a number of the plurality of data sample groups is equal to two.

5. The correlation computation method of claim 3, wherein a number of the plurality of data sample groups is equal to three.

6. The correlation computation method of claim 3, wherein a number of the plurality of data sample groups is equal to four.

7. The correlation computation method of claim 6, wherein all data samples included in the data sequence are demultiplexed by the grouping operation, such that each of said all data samples included in the data sequence is categorized into one of the plurality of data sample groups.

8. The correlation computation method of claim 1, wherein performing said at least one accumulation operation upon the data samples categorized into said at least one data sample group by the grouping operation comprises:
generating one of said at least one accumulation result by performing an accumulation operation upon data samples categorized into a same data sample group only.

9. The correlation computation method of claim 1, wherein performing said at least one accumulation operation upon the data samples categorized into said at least one data sample group by the grouping operation comprises:
generating second data samples through multiplying each of first data samples by a predetermined factor, wherein the first data samples are categorized into one of said at least one data sample group; and
generating one of said at least one accumulation result by performing an accumulation operation upon at least third data samples and the second data samples, wherein the third data samples are categorized into another of said at least one data sample group.

10. The correlation computation method of claim 1, wherein performing said at least one accumulation operation upon the data samples categorized into said at least one data sample group by the grouping operation comprises:
generating one of said at least one accumulation result by performing an accumulation operation upon at least first data samples and second data samples, wherein the first data samples are categorized into one of said at least one data sample group, and the second data samples are categorized into another of said at least one data sample group.

11. The correlation computation method of claim 1, wherein said at least one accumulation result comprises a single accumulation result only; and deriving the correlation value between the data sequence and both of the in-phase code sequence and the quadrature code sequence from said at least one accumulation result comprises:
setting the correlation value by a mathematical manipulation value of the single accumulation result.

12. The correlation computation method of claim 1, wherein said at least one accumulation result comprises a plurality of accumulation results; and deriving the correlation value between the data sequence and both of the in-phase code sequence and the quadrature code sequence from said at least one accumulation result comprises:
generating a plurality of mathematical manipulation values of the plurality of accumulation results, respectively; and
setting the correlation value by a sum of the mathematical manipulation values.

13. The correlation computation method of claim 1, wherein said at least one accumulation result comprises a plurality of accumulation results; and deriving the correlation value between the data sequence and both of the in-phase code sequence and the quadrature code sequence from said at least one accumulation result comprises:
generating a sum of the plurality of accumulation results; and
setting the correlation value by a mathematical manipulation value of the sum.

14. The correlation computation method of claim 1, wherein said at least one accumulation result comprises a first accumulation result and a second accumulation result; and deriving the correlation value between the data sequence and both of the in-phase code sequence and the quadrature code sequence from said at least one accumulation result comprises:
generating a multiplication result through multiplying the first accumulation result by a conjugate of the second accumulation result; and
deriving the correlation value from the multiplication result.

15. The correlation computation method of claim 14, wherein deriving the correlation value from the multiplication result comprises:
deriving the correlation value from an imaginary part of the multiplication result.

16. The correlation computation method of claim 15, wherein deriving the correlation value from the imaginary part of the multiplication result comprises:
generating an absolute value of the imaginary part of the multiplication result; and
setting the correlation value by the absolute value.

17. The correlation computation method of claim 15, wherein deriving the correlation value from the imaginary part of the multiplication result comprises:
obtaining relative data bit sign between an in-phase component and a quadrature component; and
referring to the relative data bit sign and the imaginary part of the multiplication result for setting the correlation value.

18. The correlation computation method of claim 14, wherein deriving the correlation value from the multiplication result comprises:
setting the correlation value by the multiplication result.

19. The correlation computation method of claim 1, wherein said at least one accumulation result comprises a first accumulation result and a second accumulation result; and deriving the correlation value between the data sequence and both of the in-phase code sequence and the quadrature code sequence from said at least one accumulation result comprises:
obtaining relative data bit sign between an in-phase component and a quadrature component; and
setting the correlation value by a combination of the first accumulation result and a second accumulation result, where coefficients of the combination are determined by the relative data bit sign.

20. The correlation computation method of claim 1, wherein said at least one accumulation result comprises a first accumulation result and a second accumulation result; deriving the correlation value between the data sequence and both of the in-phase code sequence and the quadrature code sequence from said at least one accumulation result comprises:
generating a first computation result by $G_e+jG_o$ and a second computation result by $G_o+jG_e$, where $G_e$ represents the first accumulation result, and $G_o$ represents the second accumulation result;
setting the correlation value by a maximum among a square of the first computation result and a square of the second computation result.

21. The correlation computation method of claim 1, wherein the correlation computation method is employed by a correlator in a global navigation satellite system (GNSS) receiver.

22. A correlation computation apparatus comprising:
a grouping circuit, arranged to perform a grouping operation upon a data sequence according to an in-phase code sequence and a quadrature code sequence, wherein the data sequence is derived from a quadrature phase shift keying (QPSK) modulated signal;

an accumulation-based circuit, arranged to perform at least one accumulation operation upon data samples categorized into at least one data sample group by the grouping circuit, to generate at least one accumulation result; and a processing circuit, arranged to derive a correlation value between the data sequence and both of the in-phase code sequence and the quadrature code sequence from said at least one accumulation result.

* * * * *